United States Patent
Kobayashi et al.

(10) Patent No.: US 7,219,089 B2
(45) Date of Patent: May 15, 2007

(54) DATA RETRIEVAL METHOD, SYSTEM AND PROGRAM PRODUCT

(75) Inventors: Mei Kobayashi, Yokohama (JP); Masaki Aono, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 10/669,799

(22) Filed: Sep. 24, 2003

(65) Prior Publication Data

US 2004/0068493 A1  Apr. 8, 2004

(30) Foreign Application Priority Data

Oct. 4, 2002  (JP) .............................. 2002-291970

(51) Int. Cl.
*G06F 7/00* (2006.01)
*G06F 17/30* (2006.01)

(52) U.S. Cl. .................. 707/1; 707/3; 707/4; 707/5

(58) Field of Classification Search .................. 707/3, 707/4, 101, 1, 5; 704/4, 8, 9; 715/501.5
See application file for complete search history.

(56) References Cited

U.S. PATENT DOCUMENTS

| | | | |
|---|---|---|---|
| 5,983,251 A * | 11/1999 | Martens et al. ............. | 708/203 |
| 6,260,038 B1 * | 7/2001 | Martin et al. .................. | 707/7 |
| 6,510,406 B1 * | 1/2003 | Marchisio ..................... | 704/9 |
| 6,636,862 B2 * | 10/2003 | Lundahl et al. ............. | 707/101 |
| 6,804,688 B2 | 10/2004 | Kobayashi et al. .......... | 707/203 |
| 6,920,450 B2 * | 7/2005 | Aono et al. .................... | 707/3 |
| 2004/0083452 A1 * | 4/2004 | Minor et al. ................. | 717/109 |

FOREIGN PATENT DOCUMENTS

JP  2001-312505 A2  11/2001

OTHER PUBLICATIONS

Rie Kubota Ando (2000), Latent Semantic Space: Iterative Scaling Improves Precision of Inter-document Similarity Measurement, pp. 216-223.*

Vasileios Hatzivassiloglou, Luis Gravano, and Ankineedu Maganti (2000), An Investigation of Linguistic Features and Clustering Algorithms for Topical Document Clustering, pp. 224-231.*

(Continued)

*Primary Examiner*—Alford Kindred
*Assistant Examiner*—Merilyn Nguyen
(74) *Attorney, Agent, or Firm*—Richard M. Goldman

(57) ABSTRACT

A data retrieval system having a database storing data as a vector that has been digitized based on a keyword. The system has capability of generating a residual vector from the data to compute a covariance matrix and an eigenvector of the covariance matrix. The system further has the capability for generating and storing a set of basic vectors from the set of the computed eigenvectors, and for reading out the data and at least one of the eigenvectors from a memory. This is utilized to compute a contribution of the eigenvector to the data, and for contracting or enlarging a residual vector to store. The system selects a keyword to be used for labeling according to a similarity between the stored basic vector and the data, and a weight on the similarity so as to store the keyword in a memory.

9 Claims, 22 Drawing Sheets

OTHER PUBLICATIONS

Hironori Takeuchi et al, "An Information Retrieval System Using A Principal Component Analysis", Technical Report of Information Processing Soc of Japan, Mar. 15, 2002, vol. 2002, No. 28, pp. 87-93.

Masaki Aono et al., "Information Retrieval and Visualization of Massive Database Unsing Dimensional Reduction based on Vector Space Model," Technical Report of Information Processing Soc of Japan, Jun. 7, 2002, vol. 2002, No. 54pp. 79-84.

Office Action of Sep. 13, 2005 received from Japanese Patent Office.

Leonard Kaufman and Peter Rousseeuw, *Finding Groups In Data: An Introduction To Cluster Analysis*, Wiley-Interscience, New York, New York, USA, ISBN 0-471-87876-6.

Rie Kubota Ando and Lillian Lee, *Iterative Residual Rescaling: An Analysis and Generalization of LSI*, SIGIR '01, Sep. 9-12, New Orleans, LA, USA, ACM 1-58113-331-6/01/0009, pp. 154-162, Copyright 2001.

Rie Kubota Ando, *Latent Semantic Space: Iterative Scaling Improves Precision of Inter-document Similarity Measurement*, SIGIR 2000, Jul. 2000, Athens Greece, Copyright 2000, ACM 1-58113-226-3/00/0007.

E. Rasmussen, "Clustering Algorithms" in William B. Frakes and Ricardo Bacza-Yates, Editors, *Information Retrieval- Data Structures and Algorithms*, Prentice Hall, Upper Saddle River, NJ, USA, Copyright 1992, ISBN 0-13-463837-9.

* cited by examiner

Estimation of basic vector
Input : M'×N matrix data A'
: Number of desired basic vectors k
: Threshold $\lambda$
: Scaling offset value $\mu$
Output: k basic vectors {$b_i$:i=1,...,k}

(A',$k,\lambda,\mu$,b){
A' : (file) pointer to M'×N matrix
$R_+,R_-$ : M' dimensional vector
R : N dimensional vector (denotes as $R_t[j]$ but without need for holding M'×N)
C : N×N matrix: //for holding covariance matrix
*w,t : double;*
*first : boolean;*

*first =true;*
for (int $p=1; p \leq k; p++$){
    if (!*first*){
        for (int $i=1; i \leq M'; i++$){ //step 1: selective scaling
            $t = |r_i|$; // obtain the length of each model vector
            if ($|R_s[i]| > \lambda$){ //inner product with basic vector is larger if ($R_s[i] > 0.0$) $w = (1 - R_s[i])^{(\mu+t)}$;

else $w = (1 + R_s[i])^{(\mu+t)}$;

for (int $j=1; j \leq N; j++$){
                    $R_i[j] = R_i[j] \times w$; //scaling
                }
            }
            else continue;
        }
    }

Figure 4

$$C = \frac{1}{M'}\sum_{i=1}^{M'} \mathbf{d}_i \mathbf{d}_i^t - \bar{\mathbf{d}}\bar{\mathbf{d}}^t \; ; // \text{step 2: calculate the covariance matrix}$$

$\mathbf{b}_p = EVD(C);$ //step 3: eigenvector for maximum eigenvalue $MGS(\mathbf{b}_p);$ //step 4: Modified Gram Schmidt $output(\mathbf{b}_p);$ //output the i-th basic vector for (int $i = 1; i \le M'; i++$){ //step 5: compute the contribution matrix
    $R_m[i] = R_s[i] = 0.0;$
    for (int $j = 1; j \le N; j++$){
        $R_m[i] += R_i[j] \times b_p[j];$
        $R_s[i] += R_i[j] \times R_i[j];$
    }
    if $(R_s[i] == 0.0) R_s[i] = 0.0;$
    else $R_s[i] = R_m[i] / \sqrt{R_s[i]};$
}
for (int $i = 1; i \le M'; i++$){ //step 6: compute the residual vector
    for (int $j = 1; j \le N; j++$){
        $R_i[j] = R_i[j] - R_m[i] \times b_p[j];$
    }
}
if (*first*) *first* = *false*;
}

Figure 5

```
1  ==========================loop: r = 1
2  
3  largest  innerProduct = 0.9998399000041365
4  smallest innerProduct = -0.0021135015305200886
5  
6  OK plus!--------- doc = 94636 cnt = 1
7  OK plus!--------- iP = 0.9998399000041365
8          (extrinsic) keywd = suzuki
9          (extrinsic) keywd = samurai
10         (extrinsic) keywd = japan
11 OK plus!--------- doc = 50840 cnt = 2
12 OK plus!--------- iP = 0.9743064944873534
13         (extrinsic) keywd = suzuki
14         (extrinsic) keywd = samurai
15         (extrinsic) keywd = sale
16 OK plus!--------- doc = 92853 cnt = 3
17 OK plus!--------- iP = 0.9372885374943962
18         (extrinsic) keywd = suzuki
19         (extrinsic) keywd = samurai
20         (extrinsic) keywd = sale
21 OK plus!--------- doc = 68088 cnt = 4
22 OK plus!--------- iP = 0.8239438960864272
23         (extrinsic) keywd = suzuki
24         (extrinsic) keywd = japan
25         (extrinsic) keywd = plan
26 OK plus!--------- doc = 2733 cnt = 5
27 OK plus!--------- iP = 0.7617615667012242
28         (extrinsic) keywd = suzuki
29         (extrinsic) keywd = samurai
30         (extrinsic) keywd = car
31         (intrinsic) keywd2 = sheriff
32 OK plus!--------- doc = 108212 cnt = 6
33 OK plus!--------- iP = 0.7123501270905321
34         (extrinsic) keywd = suzuki
35         (extrinsic) keywd = samurai
36         (extrinsic) keywd = car
37         (intrinsic) keywd2 = asher
38 OK plus!--------- doc = 79412 cnt = 7
39 OK plus!--------- iP = 0.6236521912165935
40         (extrinsic) keywd = suzuki
41         (extrinsic) keywd = maker
42         (extrinsic) keywd = resign
43         (intrinsic) keywd2 = tire
```

Figure 8

Input : k basic vectors
: M'×N matrix data A'
: keyword data keyword (N)
: Number p of keywords representing cluster
: Threshold δ for separating cluster
: stopWord for use in cluster labeling
Output : labeled cluster set (A', b, keyword, stopWord, p, δ, clusters){
keyword : String[N]; // holding the keyword
stopWord : String[]; // holding the stop word list
b : double[k][N]; // k N-dimensional basic vectors
minValue, maxValue : double[M'][k]; // holding the maximum and minimum of inner product
minIndex, maxIndex : integer[M'][k]; // holding the maximum and minimum index of inner product
model : double[N]; // holding the i-th record of A'
keywordIndex : integer[M'][p]; // holding the index corresponding to keyword
innerProduct : double[M']; // holding the value of inner product
index1, index2 : integer[M']; // holding the index of data
maxModel : double; // holding the maximum value of data
cluster1, cluster2 : variable - length integer array; // holding the cluster data
label1, label2 : String; // label of cluster (for output)

// step 1: initialization of various kinds of data
cluster1 = cluster2 = null; // initialization of cluster
label1 = label2 = null; // initialization of cluster label
for (int $r = 1; r \leq k; r++$){

Figure 10

```
for (int j = 1; j ≤ p; j + +) // initialization of index
        keywordIndex[i][j] = -1;
maxModel = 0.0;
String line = read(I-th record of A');
while (hasMoreTokens()){ // step 2: record processing for A'
        int q = getToken(line);
        model[q] = Double(getToken());
        if (model[q] > maxValue){
                keywordIndex[i][1] = q;
                maxModel = model[q];
                j = 1;
                while (keywordIndex[i][j] ≠ -1
                        and j < p){
                        keywordIndex[i][j + 1] =
                                keywordIndex[i][j];
                        j + +;
                }
        }
}
double t = t1 = t2 = 0.0;
for (int j = 1; j ≤ N; j + +){ // step 3: compute the similarity
        t1 = b[r][j] × model[j];
        t2+ = model[j] × model[j];
        if (t1 > maxValue[i][r]){
                maxValue[i][r] = t1;
                maxIndex[i][r] = j;
```

Figure 11

```
        }
        if (t1 < minValue[i][r]){
                minValue[i][r] = t1;
                minIndex[i][r] = j;
        }
        t += t1;
    }
    copyArray(index1, index2);  // copying index 2 to index 1 t = t / √t2;  // normalization innerProduct[i] = t;  // inner product with basic vector
}
// step 4: sorting and deciding process of cluster
SortIndexedDescend(M ', index1, innerProduct);  // sorting
// cluster process of basic vector in positive direction
i = 1;
while (innerProduct[i] > δ and i ≤ M '){
    addCluster(cluster1,
            index[i], keyword, p, maxIndex[i], keyIndex[i]);
    i++;
}
// cluster process of basic vector in negative direction
i = M ';
while (-innerProduct[i] > δ and i ≥ 1){
    addCluster(cluster2,
            index[i], keyword, p, minIndex[i], keyIndex[i]);
    i--;
}
// step 5: cluster classification and labeling
makeClusterLabel(r, stopWord, cluster1, cluster2, label1, label2);
output(r, cluster1, cluster2, label1, label2);
    }
}
```

Figure 12

```
 1 basis vector,cluster label,# of docs,percent,type
 2 1+,"Suzuki, samurai, car, sale, Japan",83,0.065,Noise
 3 2+,"Nixon, China, library, Watergate, Beijing",1342,1.051,Major
 4 3+,"China, Beijing, NCA, Chinese, Soviet",2662,2.084,Major
 5 4+,"aspen, Colorado, Chicago, condominium, tent",113,0.088,Noise
 6 5+,"hospital, patient, California, health, trauma",16594,12.990,Major
 7 5+,"Hussein, administration, oil, gulf, Jordan",978,0.766,Outlier
 8 5+,"campaign, candidate, measure, private, change",690,0.540,Outlier
 9 6+,"Iraq, Kuwait, Hussein, Iraqi, Bush",3235,2.532,Major
10 6+,"Israeli, Muslim, nation, palestine, party",240,0.188,Outlier
11 6-,"transplant, veronica, liver, child, organ",130,0.102,Outlier
12 7+,"GM, plant, auto, Ford, car",847,0.663,Outlier
13 7-,"cruise, pole, cabin, coach, Caribbean",86,0.067,Noise
14 8+,"cruise, EPA, ship, apple, chemical",777,0.608,Outlier
15 9+,"bird, fish, wildlife, species, endanger",719,0.563,Outlier
16 9-,"school, Bush, administration, cook, child",659,0.516,Outlier
17 10+,"Beijing, China, Chinese, army, troop",742,0.581,Outlier
18 10-,"team, coach, school, league, UCLA",10802,8.456,Major
19 10-,"Matsushita, company, Japanese, boycott, film",116,0.091,Noise
20 11+,"school, Amazon, Brazil, teacher, forest",2273,1.779,Major
21 12+,"team, coach, school, league, football",8307,6.503,Major
22 12-,"tax, council, Bush, port, Japan",3148,2.464,Major
23 13+,"duke, Louisiana, basketball, devil, campaign",381,0.298,Outlier
24 13-,"tax, school, budget, council, court",167,0.131,Outlier
25 14+,"school, teacher, child, education, class",3057,2.393,Major
26 14-,"police, officer, arrest, cocaine, car",3167,2.479,Major
27 15-,"Bush, art, school, acid, administration",1879,1.471,Major
28 15-,"museum, industry, collection, Japanese, house",211,0.165,Outlier
29 16+,"Bush, administration, president, congress, U.S.",2515,1.969,Major
30 16-,"art, museum, Florida, music, admission",2737,2.143,Major
31 17+,"team, coach, league, inning, point",9661,7.563,Major
32 17+,"campaign, election, commission, Asia, councilman",766,0.600,Outlier
33 17-,"school, bus, court, teacher, education",1119,0.876,Outlier
34 18+,"Bush, art, museum, artist, house",2871,2.247,Major
35 18-,"company, price, loan, AIDS, market",2072,1.622,Major
36 19+,"council, candidate, election, campaign, school",4231,3.312,Major
37 19-,"Bush, tax, art, budget, administration",1272,0.996,Outlier
38 20+,"race, ascot, midget, car, park",166,0.130,Outlier
39 20-,"Europe, Libya, Africa, Morocco, country",1096,0.858,Outlier
40 20-,"ANC, Kadafi, ability, ally, alliance",155,0.121,Outlier
```

Figure 13

| Cluster name | Kind of cluster | Number of documents (%) | Set of keywords |
|---|---|---|---|
| M-1 | major | 4000 (4%) | fruit,apple,orange,peach,banana,grape, lemon,melon,grapefruit,strawberry |
| M-2 | major | 4000 (4%) | animal,cat,dog,pig,cow,sheep, tiger,lion,elephant,monkey |
| M-3 | major | 4000 (4%) | tree,maple,oak,birch,chestnut, pine,cedar,acacia,cactus,cherry |
| M-4 | major | 4000 (4%) | sports,baseball,football,basketball,ski, marathon,swimming,jogging,sumo,tennis |
| M-5 | major | 4000 (4%) | computer,CPU,HDD,CD-ROM,DVO, LAN,FDD,modem,memory,PCMCIA |
| O-1 | outlier | 2000 (2%) | fish,salmon,carp,tuna,caribe |
| O-2 | outlier | 2000 (2%) | vegetable,tomato,cucumber,pumpkin,lettuce |
| O-3 | outlier | 2000 (2%) | insects,butterfly,ant,beetle,dragonfly |
| O-4 | outlier | 2000 (2%) | IVY,Princeton,Cornell,Harvard,Yale |
| O-5 | outlier | 2000 (2%) | disaster,typhoon,tornado,earthquake,thunderstorm |
| O-6 | outlier | 2000 (2%) | coffee,mocha,Blue Mountain,arabica,espresso |
| O-7 | outlier | 2000 (2%) | season,spring,summer,autumn,winter |
| O-8 | outlier | 2000 (2%) | musician,Beethoven,Bach,Chopin,Mozart |
| O-9 | outlier | 2000 (2%) | mountain,Fuji,Everest,Matterhorn,Kilimanjaro |
| O-10 | outlier | 2000 (2%) | jewel,diamond,gold,pearl,ruby |
| O-11 | outlier | 2000 (2%) | entrails,heart,liver,stomach,bowel |
| O-12 | outlier | 2000 (2%) | sense,eye,ear,mouth,nose |
| O-13 | outlier | 2000 (2%) | bird,pigeon,crow,sparrow,parrot |
| O-14 | outlier | 2000 (2%) | shoes,sandal,boots,spike,highheels |
| O-15 | outlier | 2000 (2%) | river,Mississippi,Nile,Huang,Rhine |
| O-16 | outlier | 2000 (2%) | language,English,Japanese,French,Chinese |
| O-17 | outlier | 2000 (2%) | president,Kennedy,Washington,Lincoln,Roosevelt |
| O-18 | outlier | 2000 (2%) | artist,Cezanne,Van Gogh,Picasso,Renoir |
| O-19 | outlier | 2000 (2%) | color,red,white,clue,green |
| O-20 | outlier | 2000 (2%) | furniture,bed,bookshelf,cupboard,sofa |
| Noise | noise | 40000 (below 1%) | 1850 distinct keywords (absence,···,zirconium) |

Figure 17

| $b_i$ | Positive direction | | | | Negative direction | | | |
|---|---|---|---|---|---|---|---|---|
| | % | type | Contribution | Label | % | type | Contribution | Label |
| 1 | 4.9 | M | 5.18 | Fruit | | | | |
| 2 | 3.9 | M | 4.64 | Animal | | | | |
| 3 | 3.2 | M | 2.87 | Tree | 4.3 | M | -2.94 | Sports |
| 4 | 3.2 | M | 3.25 | Computer | | | | |
| 5 | | | | | 2.9 | O | -1.04 | River |
| 6 | 2.5 | O | 1.00 | Fish | | | | |
| 7 | 2.2 | O | 0.72 | Coffee | 2.3 | O | -0.75 | Entrails |
| 8 | | | | | 2.2 | O | -0.97 | Bird |
| 9 | 2.1 | O | 0.79 | Shoes | 2.0 | O | -0.68 | Furniture |
| 10 | 2.1 | O | 0.85 | President | 1.9 | O | -0.60 | Sense |
| 11 | | | | | 1.8 | O | -1.01 | Color |
| 12 | 1.8 | O | 0.77 | Season | 1.8 | O | -0.72 | Language |
| 13 | | | | | 1.8 | O | -1.00 | Musician |
| 14 | | | | | 1.6 | O | -1.03 | Mountain |
| 15 | 1.5 | O | 0.90 | Disaster | | | | |
| 16 | | | | | 1.3 | O | -1.04 | IVY |
| 17 | | | | | 1.3 | O | -1.01 | Vegetable |
| 18 | 1.3 | O | 0.96 | Insects | | | | |
| 19 | | | | | 1.2 | O | -1.04 | Artist |
| 20 | 1.3 | O | 0.77 | Jewel | | | | |

Figure 18

DATA RETRIEVAL METHOD, SYSTEM AND PROGRAM PRODUCT

FIELD OF THE INVENTION

The present invention relates to retrieval and display of a document, and more particularly to a data retrieval system, a data retrieval method, a program for causing a computer to execute a data retrieval, a computer readable storage medium storing the program, a graphical user interface system for displaying a retrieved document, a program executed on the computer to implement a graphical user interface, and a storage medium storing the program, in which a relatively small number of documents can be efficiently retrieved from a large scale database comprising the documents, and displayed.

BACKGROUND

Recently, with the progress of computer hardware, the amount of information to be processed has more and more increased, and the database for storing the information has become larger. This trend is more remarkable in recent years when, in addition to the progress of the computer hardware, the network technology allows necessary information to be acquired using a browser software via the Internet.

Up to now, there have been proposed various methods for detecting document in a large scale database that may be arranged to include the document data, image data and audio data. For example, in Published Unexamined Patent Application No. 2002-024268 by Kobayashi and others, there was disclosed a method and system for efficiently detecting a group of a relatively small number of documents having the same or similar keyword (hereinafter referred to as an outlier cluster) among the documents included in the database. Likewise, in "Latent semantic space: iterative scaling improves precision of inter-document similarity measurement", SIGIR 2000, pp. 216–223 and SIGR 2001, pp. 152–154 by Kubota and others, a method has been proposed for efficiently retrieving an outlier cluster by scaling a document vector in a potential semantic space. Though various methods and systems for retrieving a group of a small number of documents in the database as the outlier cluster have been proposed as above described, they may be applied to a relatively small database configured by sampling, but not fully applied to a larger database storing millions of documents in terms of the retrieval speed and the detectability of outlier cluster. Though the retrieval speed is possibly improved to some extent if the computer performance is enhanced, the retrieval for the outlier cluster must be separately improved by utilizing the characteristics of document keyword matrix in the linear algebra.

Usually, the document data in the large scale database is digitized depending on whether or not a registered keyword is contained, configured as a document keyword vector, and stored in the database. The above method for retrieving the outlier cluster in the large scale database relies on calculating a residual matrix generated by successively deleting the document vector having the greatest norm. This successive calculation for the residual matrix is required to store in a main memory of the computer the matrix successively generated using an engenvector or singular vector. For example, the document data having a size of the number of documents' the number of attributes (keywords) is required to store in the main memory. Herein, in a case where the number of documents is 100,000, and the number of keywords is 1000, it is necessary to have a storage capacity of 100,000'1000'8 bytes=800 MB to store the residual matrix in real number at double precision. If the number of documents and the number of keyword are increased, an amount of data that can not be stored by the ordinary computer must be stored by generating the residual matrix. In this invention, the document keyword vector digitized based on the keyword is simply referred to as the data.

On the other hand, various cluster retrieval techniques for application to the information retrieval or data mining have been so far offered. For example, Edie Rasmussen, "Clustering Algorisms", Chapter 16, Information Retrieval, W. B. Frankes and R. Baeza-Yates Eds, Prentice Hall (1992), L. Kaufman and P. J. Rousseuw, "Finding Groups in Data", John Wiley & Sons (1990) disclosed the techniques. Also, a method for automatically labeling the detected cluster was disclosed in Alexandrian Popescul and Lyle H. Unger, "Automatic Labeling of Document Clusters", (2000). The simplest method involves labeling the cluster of given document with a word having the greatest appearance frequency.

Though the above method is simple, the cluster labeling is not sufficient, resulting in loss of the meaning of labeling, when meaningless words frequently appear in the document. In addition, there are a method for labeling the cluster with a word mostly predicted in the cluster, instead of the frequency, and a method for labeling the cluster with a title of document nearest the center of multi-dimensional data that is a constituent of the cluster. However, labeling that reflects the characteristics of cluster is not always possible. Furthermore, there is a method for labeling the cluster with the frequency information and the most predicted word by introducing a tree structure in the documents, but it is troublesome to introduce the tree structure. The above methods have a drawback of being short of full identification when the keyword used in labeling is contained in the data constituting other cluster.

In the above retrieval for outlier cluster, to enhance the availability of retrieved result, it is necessary that the outlier cluster is clearly distinguished from the major cluster, and the attribute (keyword) forming the outlier cluster is effectively presented to the user.

As above described, there is a need for the data retrieval method and system to solve the problem of scalability associated with calculation of the residual matrix and improve the retrieval for the outlier cluster. Also, there is a need for the data retrieval method and system to label the major cluster and the outlier cluster in calculating each cluster and to improve the identification of each cluster. A still further need is for a graphical user interface system capable of making more effective use of the retrieved results by efficiently presenting the attribute (keyword) of the retrieved cluster to the user who has retrieved them.

SUMMARY

In order to solve the above-mentioned problems, the present invention, a contribution vector is defined in connection with the inner product between calculated basic vector and document vector in calculating a residual matrix to enhance the retrieval for the outlier cluster. Using this contribution vector, the selective scaling is performed to calculate the residual vector, whereby the vector classified as so-called outlier cluster residing at relatively low percentage in the database is retrieved more efficiently.

In this invention, a set of basic vectors are generated by making a set of calculated eigenvectors orthogonal, and cluster is generated depending on a similarity between the generated basic vector and the data, whereby clustered retrieval results are created. In this case, the similarity included in each cluster is computed, and the keywords having higher weight are selected and stored in descending order in computing the similarity, whereby a list containing the identifier (data ID) of the data is created.

Also, in this invention, the number of data included in the generated cluster is specified, and the configuration of clusters in the database is graphically presented to the user using the area in accordance with the existence percentage of cluster in the database.

That is, the present invention provides a data retrieval system for causing a computer to retrieve data being stored in a database, the retrieval system comprising a database storing data as a vector digitized based on a keyword, a means for generating a residual vector from the data to compute a covariance matrix and an eigenvector of the covariance matrix, and for generating and storing a set of basic vectors from a set of the computed eigenvectors, a means for reading out the data and at least one of the eigenvectors from a memory, and for computing a contribution of the eigenvector to the data, and for contracting or enlarging a residual vector to store, and a means for selecting a keyword to be used for labeling according to a similarity between the stored basic vector and the data, and a weight on the similarity so as to store the keyword in a memory.

The data retrieval system according to the invention may comprise a means for making the basic vectors orthogonal. In the data retrieval system according to the invention, the means for selecting the keyword to be used for labeling to store the keyword in the memory may further comprise a means for determining the weight on the similarity to the keyword and a means for storing a certain number of keywords in a descending order in the memory in connection with the weight.

This invention also provides a data retrieval method for causing a computer to retrieve data stored in a database, the data retrieval method comprising the steps of reading out data from a database storing data as a vector digitized based on a keyword, computing and storing a covariance matrix and an eigenvector of the covariance matrix, using the data, generating and storing a set of basic vectors from a set of the computed eigenvectors, reading out the data and at least one of the eigenvectors from a memory, and computing and storing a contribution of the eigenvector to the data, and computing a residual vector from the data and the eigenvector, and contracting or enlarging a residual vector by reading out the contribution to compute and store a new eigenvector.

According to the invention, there is provided a computer executable program for implementing a data retrieval method for causing a computer to retrieve data stored in a database, the program comprising the steps of reading out data from a database storing data as a vector digitized based on a keyword, computing and storing a covariance matrix and an eigenvector of the covariance matrix, using the data, generating and storing a set of basic vectors from a set of the computed eigenvectors, reading out the data and at least one of the eigenvectors from a memory, and computing and storing a contribution of the eigenvector to the data, and computing a residual vector from the data and the eigenvector, and contracting or enlarging a residual vector by reading out the contribution to compute and store a new eigenvector.

Also, the invention provides a computer readable storage medium storing a computer executable program for implementing a data retrieval method for causing a computer to retrieve data stored in a database, the program comprising the steps of reading out data from a database storing data as a vector digitized based on a keyword, computing and storing a covariance matrix and an eigenvector of the covariance matrix, using the data, generating and storing a set of basic vectors from a set of the computed eigenvectors, reading out the data and at least one of the eigenvectors from a memory, and computing and storing a contribution of the eigenvector to the data, computing a residual vector from the data and the eigenvector, and contracting or enlarging a residual vector by reading out the contribution to compute and store a new eigenvector, and generating and storing a set of basic vectors from a set of computed eigenvectors.

According to the invention, there is provided a graphical user interface system for displaying the computer retrieved data, the graphical user interface system comprising a database storing data as a vector digitized based on a keyword, a means for computing a basic vector from the data to store in a memory, a means for classifying data into clusters depending on a similarity between the stored basic vector and the data, for counting the number of data included in the cluster, and for selecting a keyword to be used for labeling according to a weight on the similarity so as to store in a memory at least the number of data and the keyword as a pair, and a means for displaying the cluster in spiral in order of the number of data of the cluster, and performing a different rendering processing for each adjacent cluster.

Also, this invention provides a program for enabling a computer to implement a graphical user interface for displaying the computer retrieved data, the program comprising the steps of reading data from a database storing data as a vector digitized based on a keyword, computing a basic vector from the data to store in a memory, classifying data into clusters depending on a similarity between the stored basic vector and the data, for counting the number of data included in the cluster, and for selecting a keyword to be used for labeling according to a weight on the similarity so as to store in a memory at least the number of data and the keyword as a pair, and displaying the cluster in spiral in order of the number of data of the cluster, and performing a different rendering processing for each adjacent cluster.

Also, the invention provides a computer readable storage medium storing a program for enabling a computer to implement a graphical user interface for displaying the computer retrieved data, the program comprising the steps of reading data from a database storing data as a vector digitized based on a keyword, computing a basic vector from the data to store in a memory, classifying data into clusters depending on a similarity between the stored basic vector and the data, for counting the number of data included in the cluster, and for selecting a keyword to be used for labeling according to a weight on the similarity so as to store in a memory at least the number of data and the keyword as a pair, and displaying the cluster in spiral in order of the number of data of the cluster, and performing a different rendering processing for each adjacent cluster.

THE FIGURES

FIG. 4 is a schematic pseudo code for the selective scaling method according to the invention;

FIG. 5 is a schematic pseudo code for the selective scaling method according to the invention (continued from FIG. 4);

FIG. 8 is a list of a keyword generated using the cluster classifying and labeling method of the invention;

FIG. 10 is a schematic pseudo code for the cluster classifying and labeling method of the invention;

FIG. 11 is a schematic pseudo code for the cluster classifying and labeling method of the invention (continued);

FIG. 12 is a schematic pseudo code for the cluster classifying and labeling method of the invention (continued);

FIG. 13 is an output list of the labeled cluster data in a CSV format in this invention;

FIG. 17 is a table showing the configuration of a test database for use in this invention;

FIG. 18 is a table for plotting the computed number of data of cluster to the number of basic vectors in this invention;

DETAILED DESCRIPTION

The preferred embodiments of the invention will be described below with reference to the accompanying drawings, but the invention is not limited to these embodiments.

A. Schematic Method for Data Retrieval

Figure 1:
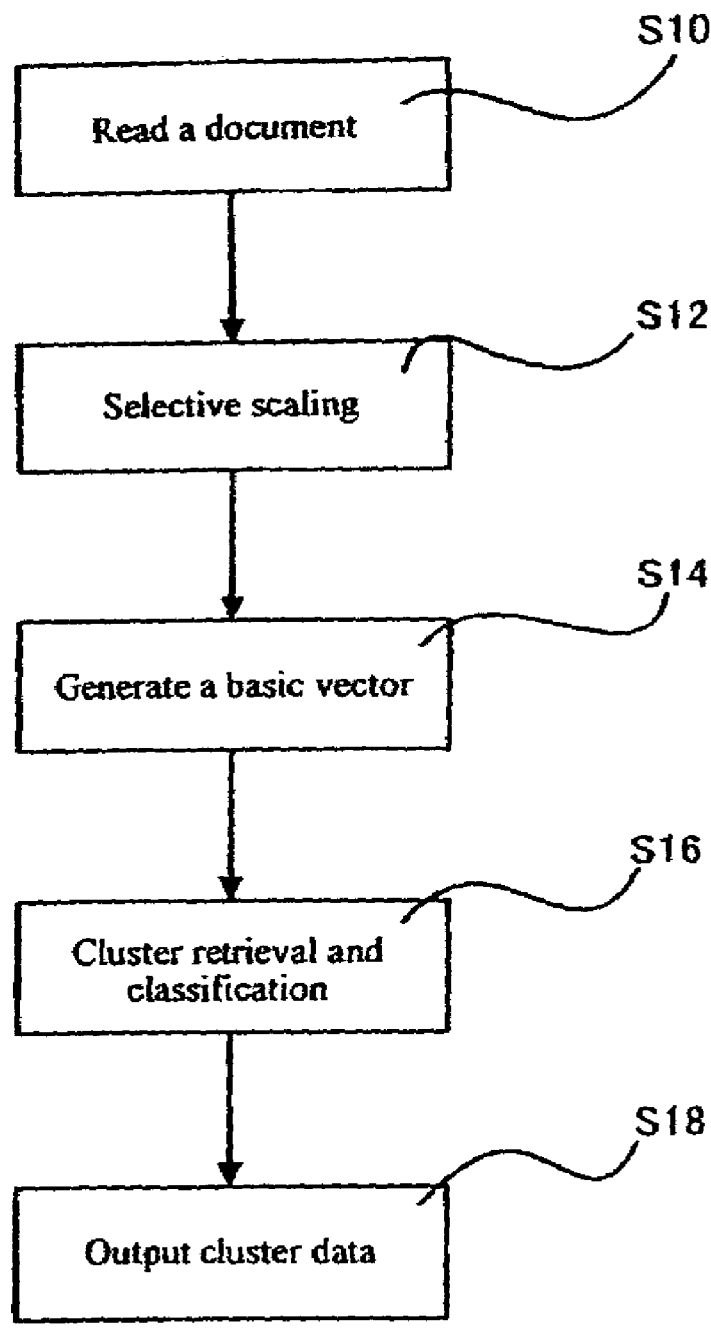
FIG. 1 is a schematic flowchart showing a data detecting method according to the present invention.

FIG. 1 is a schematic flowchart showing a data retrieval method according to the present invention. In the data retrieval method of the invention as shown in FIG. 1, data is read from a database at step S10. In this invention, the data is converted into a document keyword vector, based on a keyword and using a binary model, and stored in the database. The keyword may be designated by the database administrator when generating the document keyword vector, or registered by selecting the keyword from accumulated documents. The data is a title or index for the document data, as well as audio data and image data. Any well-known method for digitizing the data based on the keyword may be used. For example, refer to Published Unexamined Patent Application No. 2002-924268, Published Unexamined Patent Application No. 2001-205183, Published Unexamined Patent Application No. 2001-324437, and Published Unexamined Patent Application No. 2001-329613.

Then, at step S12, the selective scaling of the invention is applied to the data stored in an appropriate memory from the database to perform a process for calculating a covariance matrix. At step S14, the calculated engenvectors are made orthogonal to generate a set of estimated basic vectors (k dimensions). The set of estimated basic vectors enhances the sensibility for the outlier cluster by contracting or enlarging a residual vector according to a contribution. At step S16, the cluster classification (labeling) is performed using the generated estimated basic vectors and the keyword for labeling registered in the memory. Then, the labeled cluster data is output at step S18. In a specific embodiment of the invention, the cluster data may be output in a CSV (Comma Separated Value) format, for example. Also, in this invention, the cluster data may be output in any format in which a character string is separated by a separator such as a tabbing. The output cluster data is output to a graphical user interface system for displaying the cluster data, whereby the cluster data is displayed or analyzed in this invention.

Figure 2:
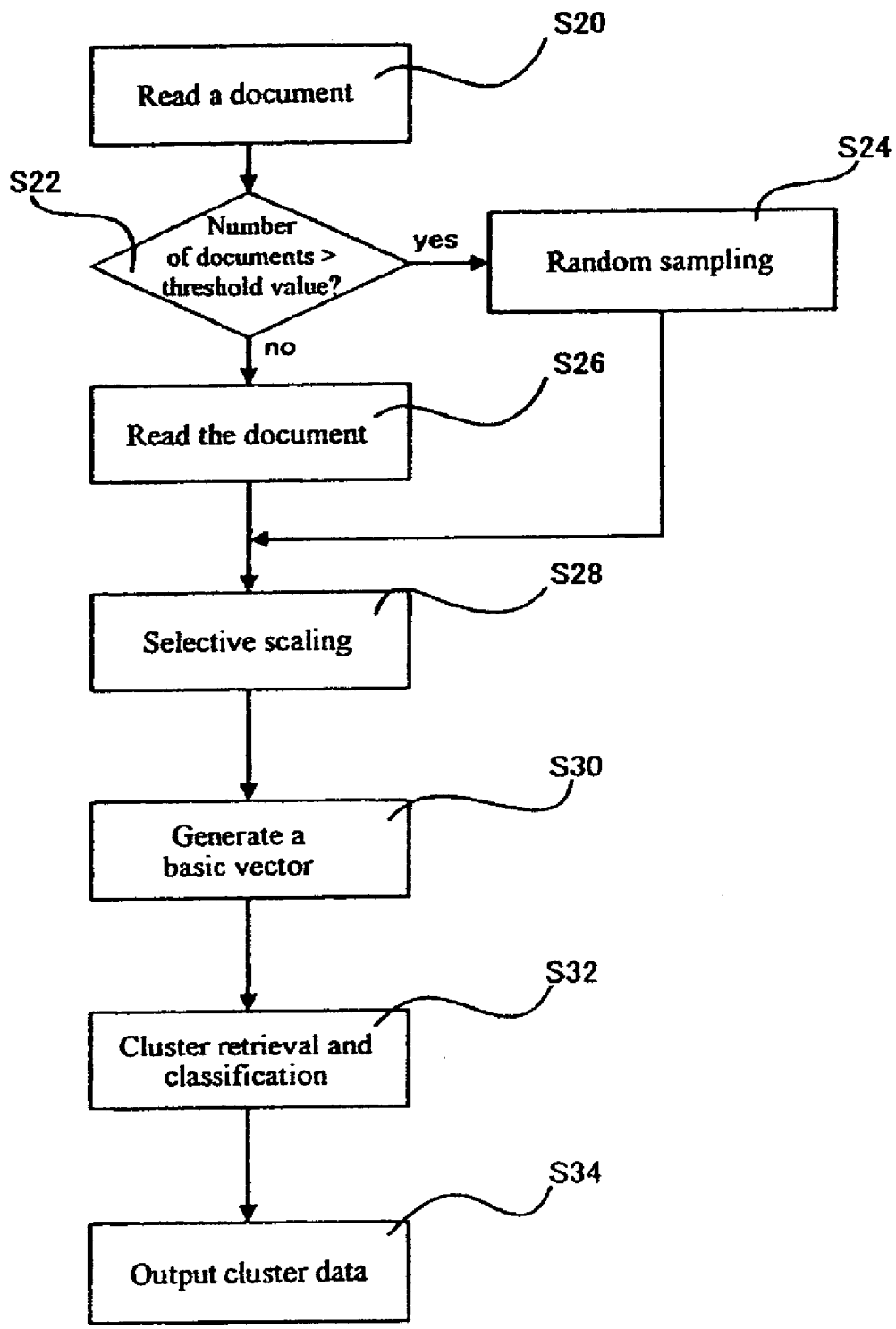
FIG. 2 is a flowchart showing another data detecting method according to the invention.

FIG. 2 is a flowchart showing another data retrieval method according to the invention. Another data retrieval method according to the invention as shown in FIG. 2 is suitably applied when the capability of a platform to selectively scale is not sufficient to directly handle the documents held in the database. Another data retrieval method according to the invention accesses to database to read out the number of data registered in the database at step S20. At step S22, a determination is made whether or not the number of read data is greater than a preset threshold value, or appropriate for directly applying the selective scaling of the invention. If it is determined at step S22 that the database is beyond the threshold value (i.e., the database is comparatively large) (yes), a predetermined number of data is randomly sampled from the database to generate a sample database for the appropriate data and hold it in an appropriate storage area for an internal memory or hard disk at step S24.

The data of the generated sample database is read at step S26. The selective scaling method is applied to the read data at step S28. The basic vectors appropriate for retrieving the outlier cluster are generated at step S30. The cluster retrieval (labeling) is performed, using the generated basic vectors at step S32. And the cluster data is output at step S34. The output cluster data is sent on line or off line to the graphical user interface system of the invention to be used for analyzing the cluster within the database or the database.

B. Generating the Basic Vectors for Data Retrieval: Selective Scaling Method

Figure 3:
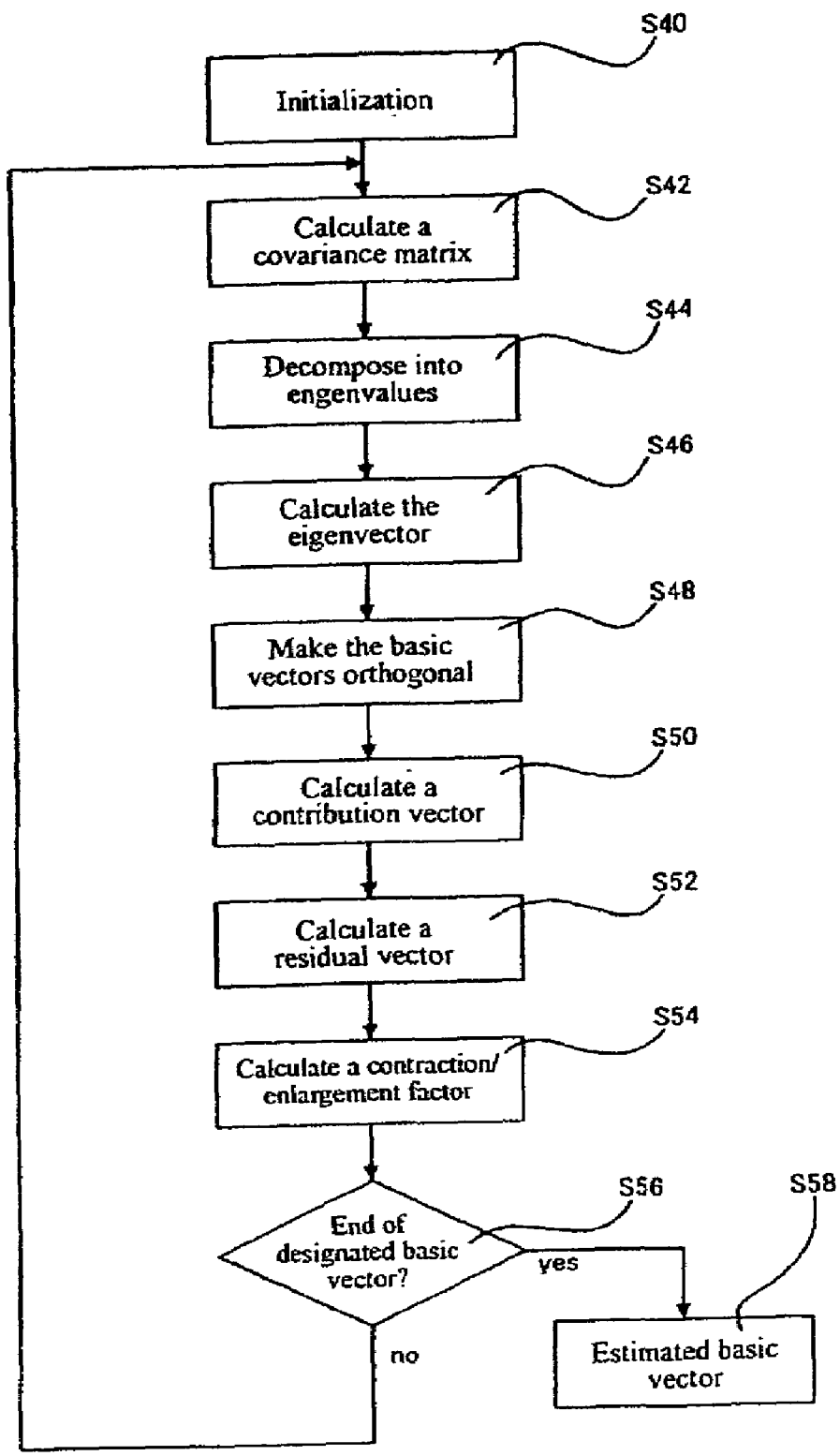
FIG. 3 is a schematic flowchart of a selective scaling method according to the invention.

FIG. 3 is a schematic flowchart showing a selective scaling process at step S28 of FIG. 2 according to the invention. The selective scaling process of FIG. 3 is applied to the data of a sample database A' after being generated. In the selective scaling process of the invention as shown in FIG. 3, at step S40, the number k of basic vectors to be generated, a threshold value l for the magnitude of the inner product of basic vector and contribution vector, an offset value m set to increase or decrease the norm are registered in the memory for setting up of the expression. At step S42, a covariance matrix is calculated for the data in the sample database. At step S44, the obtained covariance matrix is decomposed into the eigenvalues to generate the maximum eigenvalue and an eigenvector corresponding to the maximum eigenvalue. Thereafter, the eigenvectors are made orthogonal by the Modified Gram Schmidt method to enhance the retrieval precision at step S46.

At step S50, a contribution vector $R_s[i]$ is calculated. The contribution vector is calculated as a ratio of the inner product of the j-th element of the basic vector being computed at that time and the j-th element of the data to the absolute value of the j-th element of document, as will be detailed later. Consequently, a residual vector is calculated at step S52. At step S54, a contraction factor w is calculated using the computed contribution vector. Using this contraction factor, the j-th element of i-th document of the residual vector is scaled. Then, the procedure returns to step S42 to calculate the covariance matrix of the residual matrix. When the designated k-th basic vector is calculated, the procedure is ended.

FIGS. 4 and 5 are a pseudo code for performing the selective scaling method as shown in FIG. 3. As shown in FIG. 4, the pseudo code for performing the selective scaling method of the invention firstly makes declaration for each of the input values and variables to estimate the basic vector with high sensibility in the outlier cluster. Thereafter, because it is first of all necessary to estimate the basic vector at the first loop, a process of skipping calculation of the contraction/enlargement factor w, and calculating the covariance matrix and the contribution vector is performed as shown in FIG. 5. In the process of the invention, first of all, the documents held in the database are extracted randomly at several percent to generate a sample database A' and a covariance matrix for the sample database A', and to obtain the maximum eigenvalue bp by decomposing into the eigenvalues, as shown in FIG. 5. A method for use in this invention of generating the covariance matrix, decomposing into the eigenvalues and generating the basic vectors is referred to as a COV method. Then, the obtained eigenvalues are made orthogonal by applying the Modified Gram Schmidt method to estimate the k basic vectors.

In the subsequent loop, the vectors $R_m$, $R_s$ are defined to compute a contribution vector. The contribution vector is typically defined in the following expression, as listed in FIG. 5.

$$R_S = \{R_S[u]: i = 1, \ldots, M^1\}, \quad \text{[Formula 1]}$$

$$R_S[i] = \sum_{j=1}^{N} R_i[j]b_P[j] \Big/ \sqrt{\sum_{j=1}^{N} R_i[j]R_i[j]}$$

In the above expression, $r_i = \{R_i[j]: j=1, \ldots, N\}$ denotes the i-th document in the sample database, in which the element is divided by the square root of element' element for the purpose of normalization.

Then, a residual vector $R_i$ is calculated in the next loop. This residual vector $R_i$ is defined in the following expression, $$r'_i = r_i - R_m[i] \times b_p \quad \text{[Formula 2]}$$

Figure 6:
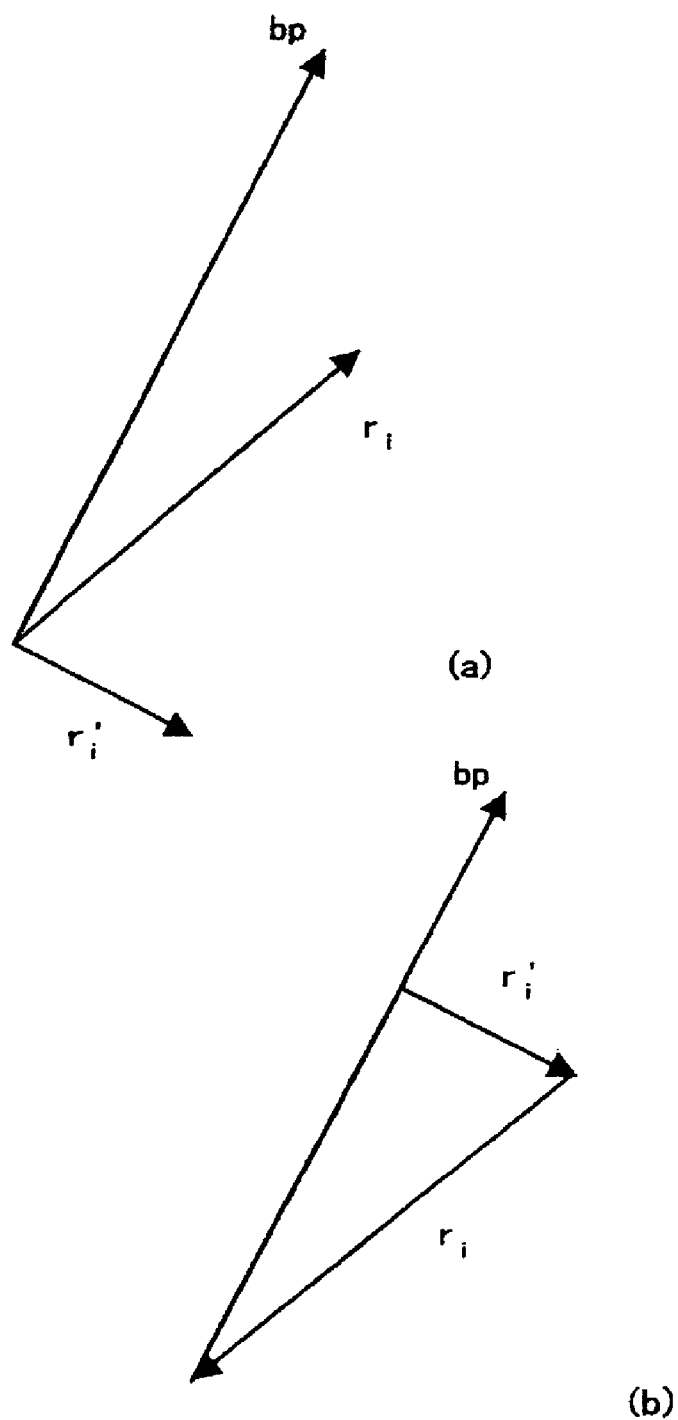
FIG. 6 is a schematic view showing the relationship between residual vector and used basic vector according to the invention.

The residual vector $R_i$ corresponds to the vector in which an element corresponding to a contribution component in a direction of the basic vector calculated at that time is subtracted from the previously obtained residual vector. That is, the basic vector used at that time and the residual vector newly generated lie in the orthogonal relationship. This relationship is shown in FIG. 6. As shown in FIG. 6, the residual vector $r_i$ newly calculated or acquired in the previous loop is not usually orthogonal to the basic vector bp used for calculation at that time. On the other hand, because the basic vector bp is selected from the larger eigenvalue obtained in the directly previous calculation of eigenvalue, the basic vector bp is directed to the main cluster, and not suitable as the basic vector in retrieving the outlier cluster. In this invention, to improve the retrievability for outlier cluster, it is necessary to apply the COV method to the residual vector subtracted by the component of the eigenvector corresponding to the larger eigenvalue. The newly generated residual vector $r_i'$ is made orthogonal to the basic vector bp used at that time, as shown in FIGS. 6A and 6B. FIGS. 6A and 6B show generating the residual vector for the data in which there is the possibility that it is generated in a positive or negative direction to the basic vector as a feature of the COV method for use in this invention. In either case, the newly generated residual vector $r_i'$ is orthogonal to the basic vector bp.

Thereafter, the process gets back to the pseudo code of FIG. 4, wherein the contraction/enlargement factor w is calculated, using a contribution vector $R_s$ generated by the pseudo code as shown in FIG. 5, in this invention. The contribution vector $R_s$ is normalized, and has a greater contribution to the basic vector as the $R_s$ is closer to 1. Therefore, in calculating the contraction/enlargement factor w, a step of contracting the residual vector having greater contribution and enlarging the residual vector having smaller contribution is performed at the next calculation for the residual vector. The residual vector with contracted or enlarged norm is used in the loop for generating the covariance matrix again, and the basic vector is calculated till i=k.

C. Cluster Classification/Labeling

C-1: Similarity Calculation and Keyword Selection for Labeling

Figure 7:
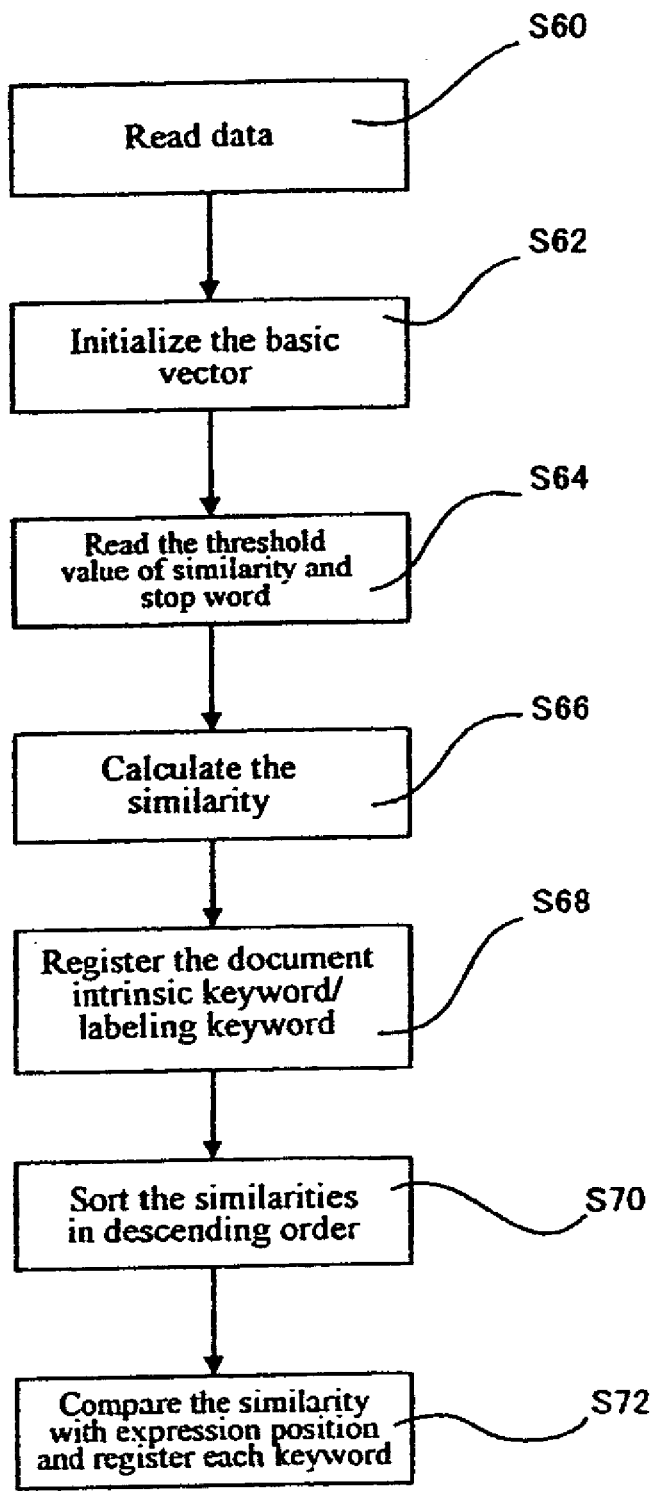
FIG. 7 is a schematic flowchart of a cluster classifying and labeling method of the invention.

In this invention, the clusters are automatically labeled, using the basic vector generated by the method as explained in section A, and the labeled data is classified into the clusters. FIG. 7 is a schematic flowchart of a process for cluster classifying and labeling of the invention. The process of FIG. 7 reads the basic vector data, the keyword data and the data held in the database or sample database generated in section A and stored in an appropriate memory at step S60. Then, at step S62, the basic vector is initialized such as I=$I_0$ (here, $I_0$ is an identifier of the basic vector to start). At step S64, the threshold value d input beforehand by the user and applied to the similarity held in the memory and the stop word are read from the memory.

At step S66, the similarity between the first basic vector and the data read from the database is calculated and stored in the memory. This similarity is calculated as a simple inner product, or used by calculating the normalized inner product. At step S68, among the elements contained in the document, p keywords having greater numerical value are selected in descending order from the keyword table, and a pair of data identifier and similarity are stored in the memory. The keyword having greater numerical value in this document is defined as a document intrinsic keyword. At step S68, in the calculation of similarity, the keywords having significant contribution to the similarity with the basic vector are read from the keyword list, and p keywords are selected in descending order, and stored in the memory. The keywords selected in this manner represent the similarity, and are defined as a labeling keyword (extrinsic keyword) in this invention.

At step S70, the similarities stored in the memory are sorted in descending order. Since the covariance matrix is used in this invention, positive and negative similarities are generated, whereby the documents having high similarity occur at both the positive and negative ends. At step S72, the absolute value of similarity in the positive and negative directions and the threshold value d are read and compared. The labeling keyword and the document intrinsic keyword are added, corresponding to the document identifier in which the absolute value of similarity is more than the threshold value, and registered as a pair in the memory. At step S72, corresponding keyword is not added, when the keyword is registered as the stop word.

FIG. 8 is a list of the similarity generated through the above process and the output of the data registered as the labeling keyword and the document intrinsic keyword. In the form of FIG. 8, the similarity is calculated from the inner product (iP) of the basic vector generated from the largest eigenvalue and the data, in which the largest value and the smallest value are indicated in the third and fourth lines. In the sixth to tenth lines, the document ID, the inner product of the document, the labeling keyword (extrinsic) and the document intrinsic keyword are listed. In the form as shown in FIG. 8, p=3 is assumed, in which the keyword having greatest contribution to the inner product is suzuki, then samurai, and the keyword having smallest contribution to the inner product is Japan. The keywords have a histogram as the contribution to the inner product, and are held in order of greater contribution and listed in the eighth to tenth lines.

C-2: Preprocessing for Cluster Classification

In a processing for performing the cluster classification, five data structures of doclist, keyDoclist, Key Table, result Id, and resultLabel are generated. A data structure generated to perform the cluster processing in this invention is shown in FIG. 9.

Figure 9:
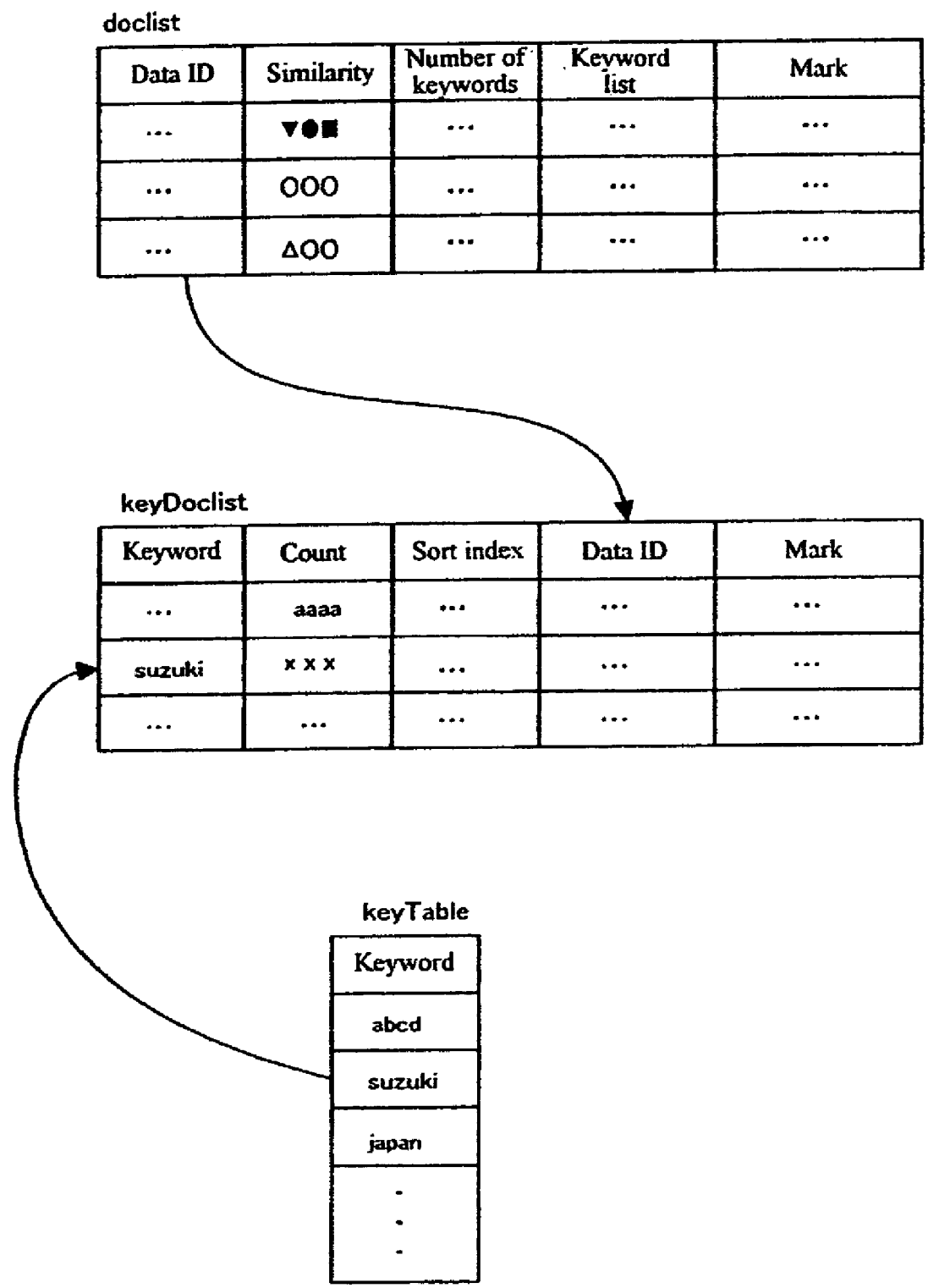
FIG. 9 is a data structure created by the cluster classifying and labeling method of the invention.

The doclist, keyDoclist and keyTable as shown in FIG. 9 are created by reading the data generated in section C-1 and stored in appropriate storage means such as a hard disk. Specifically, doclist contains a keyword list for listing the labeling keyword and the document intrinsic keyword obtained for data ID in section C-1, in which the similarity with data is held. On the contrary, for each keyword, keyDoclist holds a list of data ID for the data containing the keyword as labeling keyword or document intrinsic keyword. Also, the sort index and count is stored to be used in generating the labeling. The keyDoclist for the keyword is created, and registered in appropriate storage means. Thereafter, a hash table keyTable with the keyword as a hash key is created, in which keyDoclist is added as its element and registered in the storage means.

C-3: Labeling Based on Similarity

The cluster detection and labeling according to the invention are performed by reading the above data and using the following process. The cluster detection and labeling are firstly made by scanning the data ID corresponding to the keyword of each keyDoclist in the hash table. When the data ID processed at that time is matched with the data ID contained in doclist, the count value is set such as KeyDoclist.count[keyword]+=aydoclist.similarityy In the above expression, a denotes a weight and y y denotes the absolute value of the similarity with the data listed as doclist. This absolute value takes a value ranging from 0.0 to 1.0, and the weight a has a default value of 10.0. Thereby, the similarity is extended to a range from 0.0 to 10.0. Through this process, the value relying on the labeling keyword and the document intrinsic keyword contained in the document having greater similarity is set to the count value. Then, the count value of keyDoclist is calculated for all the keywords with the basic vector of object at that time. Thereafter, the count values are sorted in descending order (with index). Herein, the index in sorting with index is used to hold the index of the keyword before sorting, and reversely refer to the original data ID data from the data ID in order of greater count values. Thereafter, the obtained index is registered as a sort index value of keyDoclist.

Then, the variables resultId and resultLabel are initialized, the following procedure is repeated in the order in which the keywords after being sorted have greater count values, so that the cluster detection and labeling are performed simultaneously. Thus, the procedure is ended.

The labeling of cluster using the count value will be described below. First of all, the count value is monitored. If the count value is lower than or equal to a predetermined set value of e.g., 2.0 (keyword not suitable as a cluster label), the labeling of cluster is ended. If the keyword of notice at that time is marked, the keyword is skipped because the keyword has been already dealt with, and a determination for the next keyword is made. Specifically, a data ID list is read and acquired from keyDoclist containing the keyword of notice at that time. The number of keywords contained in resultLabel is judged. If the number of keywords does not exceed a predetermined number p, that keyword is added to resultLabel, or if not, the mark of keyDoclist of the keyword of notice at that time is set to true. Thereafter, the following process is performed for each of the data IDs contained in the obtained data ID list.

It is checked whether or not the data ID of notice at that time is already contained in resultId. If the data ID of notice is contained, that data ID is skipped and the procedure goes to the next step. If not, that data ID is added to resultId. Then, doclist is entirely scanned. If the same data ID is contained, doclist is marked, and all the keyword list containing the doclist is gotten. If there is any keyword contained in this keyword list and not marked by keyDoclist, the keyword is selected as a label candidate, added to resultLabel by insertion sorting, and registered in the appropriate memory. Herein, the insertion sorting means sorting the keywords so as to leave those having smaller index (larger count value) in resultLabel by comparing the sort index value obtained in sorting with each of the sort index values of all the keywords contained in the present resultLabel. Thus, the merging process of keywords is ended.

Thereafter, resultLabel obtained through this process is output as a label of the cluster, and resultId or its total number is output at the same time. At this time, the type of the cluster is decided, major, outlier or noise. It is checked whether or not any element remains in keyDoclist, and because there is the possibility that another cluster exists for the basic vector of notice at present, the above process is repeated till there are no elements unchecked in the keyDoclist.

C-4: Cluster Classification

FIGS. 10 to 12 list a pseudo code for performing classification of the cluster. In FIGS. 10 to 12, random sampling is made from the database to generate a sample database A'. The definition of each variable appears in FIG. 10. Since the cluster is labeled through the above process, the number of data (here number of pieces of data) contained in each cluster is easily counted. Thus, in a specific embodiment of the invention, classification of cluster is made in the following way. M denotes the number of data contained in the original database, when data is not randomly sampled from the database, or the number of data M' sampled in the sample database, when data is randomly sampled.

In the procedure as shown in FIGS. 10 to 12, supposing that N is the number of data contained in each labeled cluster, the clusters satisfying the following expressions can be decided as the major cluster, the noise, and the outlier cluster in the specific embodiment of the invention.

$$\text{if } \left(N \geq M \times \frac{c}{100}\right) \text{ output ("Major cluster")};$$
$$\text{else if } \left(N \leq M \times \frac{b}{100}\right) \text{ output ("Noise")};$$
$$\text{else output ("Outlier (Minor) Cluster")};$$

[Formula 3]

In the above expressions, b and c are appropriately set constants, wherein b<c is assumed to correspond to the kind of cluster. The values of b and c depend on the data to be dealt with. For example, b=1.0 and c=3.0 in the following example. That is, the data is noise if the number of data is 1% or less of the sample database, major cluster if it is 3% or more, or outlier cluster if it is from 1% to 3%. In another example, b=0.1 and c=1.0 are supposed, because the news data covers a wide variety of areas including politics, economy, culture, international situation, entertainment, health, sports and affairs.

D. Graphical User Interface for Visualizing the Cluster

The cluster, classification and labeling generated through the process as described in sections B and C are output in a CSV format for the basic vector obtained in section A or the basic vector obtained by the COV method in the specific embodiment of the invention. FIG. 13 shows an output form of the labeled cluster data generated through the process as described in sections B and C, which is configured in the CSV format. In FIG. 13, a list of data is given as basic vector ID, labeling of cluster, number of data, percentage of entire database to the document, and cluster class (type) in the first line. In this section D of the invention, a graphical user interface for visualizing the cluster data by inputting the data in the above format will be described below.

Figure 14:
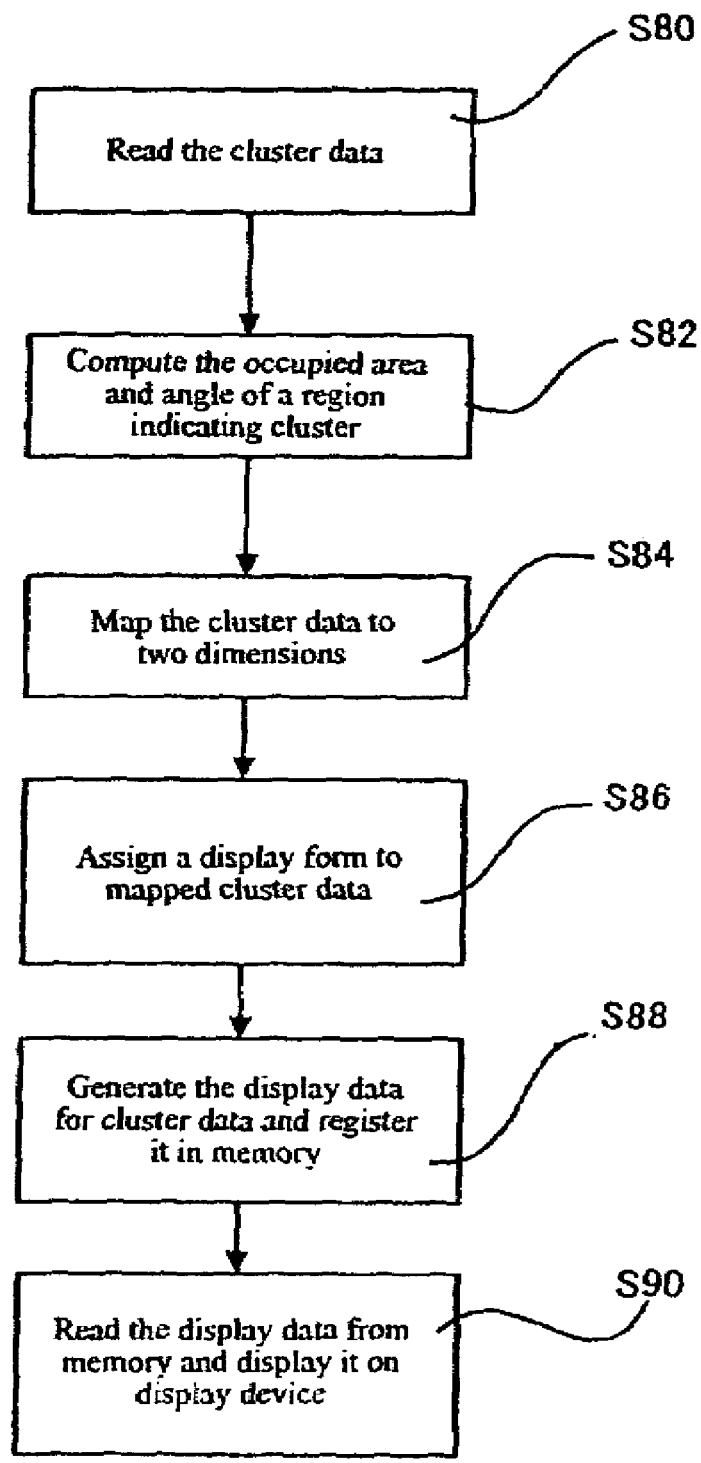
FIG. 14 is a schematic flowchart showing a display method for displaying the cluster to the user in this invention.

FIG. 14 is a flowchart showing a visualizing method for use with the graphical user interface in this invention. The visualizing method of the invention reading the cluster data stored in the CSV format as shown in FIG. 13 from the storage device such as memory, hard disk, flexible disk, optical magnetic disk, magnetic tape, compact disk (CD), or digital versatile disk (DVD) at step S80. At step S82, the occupancy area and angle of a region representing the predetermined cluster in spiral is decided in accordance with the number of documents contained in the cluster in spiral rendering. At step S84, the (multi-dimensional) cluster data obtained from a multi-dimensional basic vector is mapped in two-dimensional spiral and rendered.

At step S86, a display mode intrinsic to the cluster is automatically assigned to the segment constituting the spiral rendering. At step S88, the display data for displaying the cluster is generated and registered. At step S90, the registered display data is read, and displayed. The display mode involves the color, shading, density and pattern in the specific embodiment of the invention. The rendering for use in this invention uses the shading and the color tone, but various other rendering methods may be used in this invention.

A reason for displaying the cluster in spiral is that even if the number of clusters is increased, the display width is not varied by the display space to degrade the recognition such as a histogram. In consideration of the number of documents contained from the major cluster to the outlier cluster, the major cluster is arranged outside the spiral, and the outlier cluster is arranged inside the spiral, whereby data is naturally displayed corresponding to the number of documents contained. Thus, the configuration of cluster within the database can be intuitively presented to the user.

The spiral rendering at step S84 in the visualizing method of the invention will be described below. In the rendering at step S84, the spiral is defined in the following parametric expression.

$$\begin{cases} x(t) = (t/2n\pi)^k \cos t \\ y(t) = (t/2n\pi)^k \sin t \end{cases}$$

[Formula 4]

In the above expression, k is a positive real number value, and t is an angle assigned to the cluster area constituting the spiral. For k=1, "Archimedes' spiral" (Clifford A. Pickover, "Computers, Pattern, Chaos, and Beauty", St. Martin's Press, New York, 1990). Herein, if k is larger, the spiral becomes closer to "Sea shell" (logarithmic spiral), but the above expression is a locus of spiral and contains no concept of area.

In this invention, at step S86, to enable display using the area, the present inventors have defined a "layer" every time the spiral goes around or the angle t becomes an multiple of 2p, and introduced the concept of area by connecting the correspondence points (with the same angular period) of an outer layer and an immediately inner layer and defining a region surrounded by the outer layer, the inner layer and a line connecting the correspondence points. Next, one circumference is divided into m, and an angle q(c) assigned to the cluster (c) in accordance with the number of documents containing cluster (c) is given in the following expression.

$$\theta(c) = 2n\pi \frac{d(c)}{D}$$

[Formula 5]

Where d(c) is the number of documents containing the cluster (c) of notice at that time, and D is the total number of documents. In the specific embodiment of the invention, one circumference is divided into m, and one piece is defined as a "segment", whereby the number of segments for the cluster of notice at that time is decided in the following expression.

$$\text{segment} = ceil\left(\frac{m\theta}{2\pi}\right)$$

[Formula 6]

In the above expression, ceil( ) denotes an integer value of the numerical value in parentheses rounded up.

Moreover, the rendering is performed in accordance with the display mode having the obtained segment designated. In this specific embodiment of the invention, the color is used as the display mode, and to enhance the visibility, the rendering is performed to have lower density in the central part and higher density at layer boundary so that the spiral is recognized like a "shell", with the simple shading made to swell up.

In another embodiment of the visualizing method according to the invention, the spiral is subjected to contraction or enlargement, parallel translation and rotation in a spirally rendered state, or the label attached to the cluster is pop-up displayed interactively by pointing to and selecting the cluster. In another embodiment of the invention, the user selects a plurality of (e.g., three) clusters in the spirally rendered state, and the document contained in each cluster is projected three dimensionally, using the basic vector corresponding to the selected cluster as the Cartesian coordinates for display. In a three dimensional display mode of the invention, the cluster is subjected to contraction and enlargement, parallel translation and rotation in three dimensions, and the document is selected.

The pseudo code for executing the GUI for spiral rendering according to the invention is as follows. This pseudo code inputs a file name in CSV format, a spiral pitch number, the total segment number in spiral, and a scaling factor for the number of divisions for one circumference concerning how much angle is given according to the percentage of cluster. In this invention, these input values are used to perform the spiral rendering, in which the area of each cluster is portioned at a circumferential angle of spiral corresponding to the size of cluster on a display window so as to excellently grasp a distribution from the major cluster to the outlier cluster. After the end of the spiral rendering, the GUI is ended by clicking a close button on the display window with pointer means such as a mouse.

```
GUI (filename, scale, pitch, segments){
FileName: String;//CSV filename
Scale: Integer;//scale factor for spiral angle
Pitch: Integer;//pitch number of spiral
Segments; Integer;//total number of segments
TotalDocs: Integer;//total number of documents
NumClusters: Integer;//number of clusters
sign: Integer;//1(+1), -1(-1) sign
dimension: Integer;//dimension of basic vector
numDocs: Integer;//number of documents contained in cluster
label: String;//label of cluster
percent: Float;//percentage of the cluster in total document
type: Integer;//type of cluster (0:Major, 1:Outlier, 2:Noise)
at: Affine Transform;//Affine transformation (rotation, movement, enlargement/contraction)
holding
spr: array of Spiral;//for holding spiral
file: FILE;//file handle
      //step 1: reading a CSV file
      file=open(filename);
      while (!file.EOF){
          file.read(sign. dimension, numDocs, label, percent, type);
          totalDocs=totalDocs + numDocs;
          registerCluster(sign, dimension, numDocs, label,
                 percent, type);
          numClusters=numClusters + 1;
      }
      //step 2: deciding the size and color of cluster
      for (inti=1; i£numClusters; i++){
          Cluster c=(Cluster)getCluster(i);
              Size = (scale*C.getNumDocs()/totalDocs)+1;
              Color color = randomColor();// different colors for adjacent clusters
              c.setAttribute(size, color);
          }
          //step 3: drawing the cluster and GUI process
      spr = new Spiral[segments];
      while (true){
          at = getAffineTransform();// acquiring parameters for affine transformation
          drawSpiral(spr, at, pitch, segments);
          drawSelected(at);// pop-up the label of selected cluster
          if (mouse.windowClosed)exit();// exit is selected by mouse
      }
}
}
drawSpiral(spr, at, pitch, segments){
      setTransform(at);// for affine transformation
      Float delta = 2*pitch*p/segments;
      Integer i0 = segments/4;// skip drawing for first 1/4 spiral
      Float t = i0 * delta;
      for (int i=0; I ≦ segments; i++, t+=delta) {
          int j = segments - i - 1;
          int layer = pitch * j / segments;
          Float x = (t/(2*pitch*p))³cos t;
          Float y = (t/(2*pitch*p))³sin t;
          Spr[j] = new Spiral(x,y,layer);
      }
      Integer clusterCnt = 0;
      Cluster c = (Cluster)getCluster(clusterCnt);
      Integer numPolygons = c.getSize();
      Integer oneLayer = segments/pitch;
      for (int j=1, k=0; j ≦ segments; j++){
          while (numPolygons > 0){
```

```
                Vector2D x0 = map2D(spr[k]);
                Vector2D x1 = map2D(spr[k+1]);
                Vector2D x2 = map2D(spr[k+oneLayer+1]);
                Vector2D x3 = map2D(spr[k+oneLayer]);
                Color = c.getColor();
                fil 1 PolygonWithGradientPaint(x0,x1,x2,x3,color);
                numPolygons--;
                k = k + 1;
                j = j + 1;
        }
        clusterCnt++;
        Cluster c = (Cluster)getCluster(clusterCnt);
        numPolygons = c.getSize();
    }
}
```

E. Data Retrieval System

Figure 15:
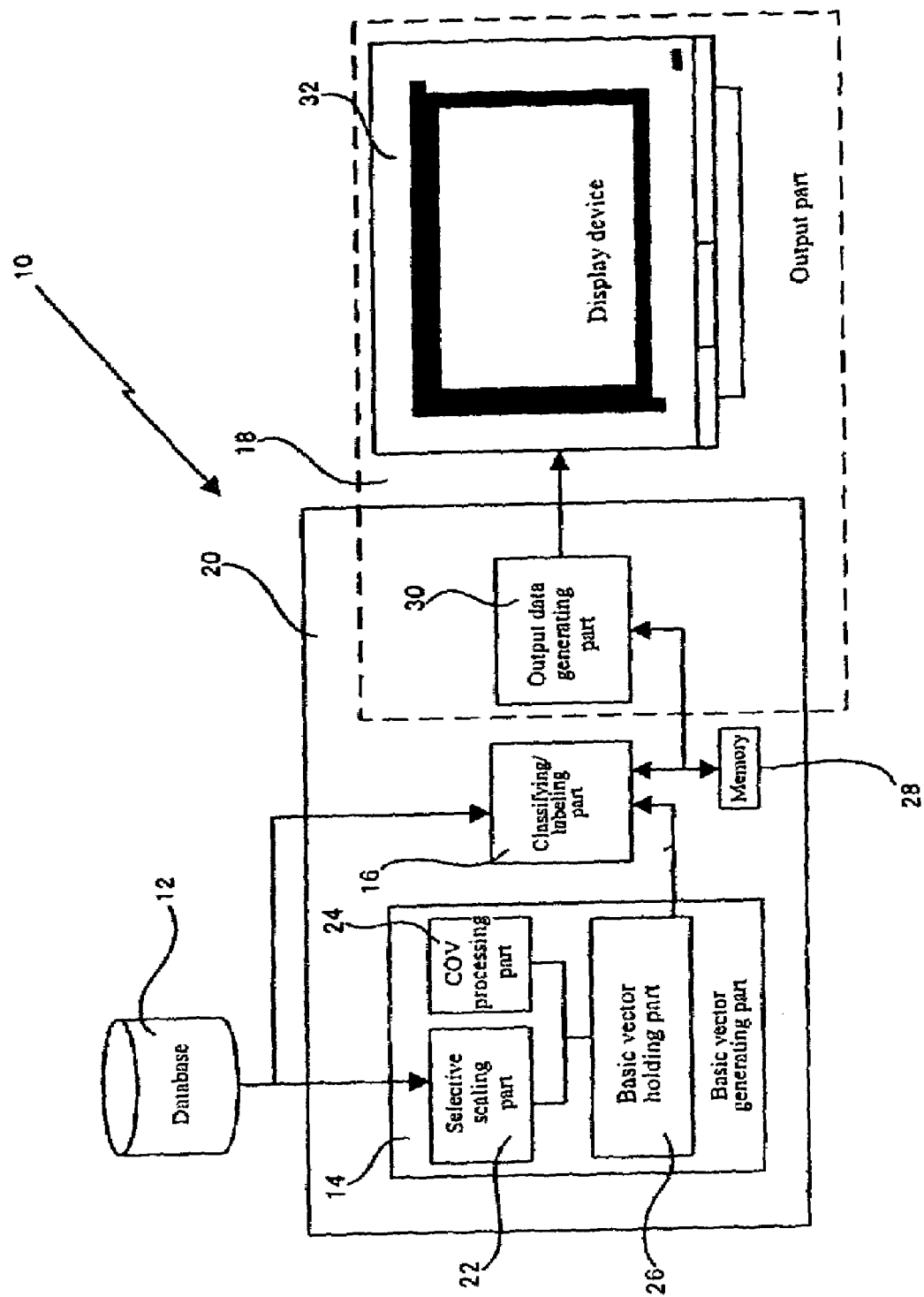
FIG. 15 is a schematic functional block diagram for a data retrieval system according to the invention.

FIG. 15 is a schematic functional block diagram for a data retrieval system according to the invention. The data retrieval system 10 of the invention as shown in FIG. 15, comprises a basic vector generating part 14 for reading data stored in a database 12, and generating the basic vector that can be appropriately used to retrieve the outlier cluster by applying the selective scaling method, a classifying/labeling part 16 for performing the cluster classification and labeling using the generated basic vector, and an output part 18 for outputting the generated cluster classification and labeling in a predetermined data format. The basic vector generating part 14, the classifying/labeling part 16 and the output part 18 are configured by a single computer apparatus 20 placed at a single site in a preferred embodiment of the invention as shown in FIG. 15.

The computer apparatus 20 may be a personal computer, a workstation, and a general-purpose large computer. In another embodiment of the invention, the basic vector generating part 14 for performing the selective scaling method which imposes the greatest load on the central processing unit (CPU) is configured on the general-purpose large computer or dedicated workstation having a lower processing speed, whereby the basic vector is calculated in night time when the user does not frequently make access.

The database 12 is directly connected to the computer apparatus 20 in the embodiment as shown in FIG. 15. The computer apparatus 20 as shown in FIG. 15 may handle temporary data which is added or deleted to or from the database 12, or the computer apparatus 20 may comprises a document vector generating part for digitizing the data, registering and generating the keyword, and generating the document keyword vector.

The basic vector generating part 14 further comprises a selective scaling part 22 for performing the selective scaling and a COV processing part 24 for generating the basic vector by applying the COV method. The selective scaling part 22 performs the selective scaling such as calculating the residual vector and calculating the contribution vector, and the COV processing part 24 estimates the basic vector by applying the COV method for a certain matrix. Also, the basic vector generating part 14 further comprises a basic vector holding part 26 for holding the basic vector generated by the selective scaling part 22, whereby the data of basic vector is passed to the classifying/labeling part 16.

The classifying/labeling part 16 reads the information of the basic vector generated by the basic vector generating part 14 from the basic vector holding part 26, and reads the data from the database 12 to classify and label the cluster, whereby the table of FIG. 9 and data such as resultLabel and resultId are stored in the storage means 28 such as memory or hard disk.

The data retrieval system of this invention receives a retrieval instruction via a network, not shown, retrieves the cluster in response to the instruction, and sends its result to the network in data format. Moreover, in this invention, the cluster is displayed, using the spiral rendering, and its result as a Web page is displayed on the computer apparatus installed at a site issuing the retrieval instruction.

The output part 18 comprises an output data generating part 30 and a display device 32 for displaying the data generated by the output data generating part 30. The output data generating part 30 reads the data stored in the memory 28, processing the data and outputs the data in CSV format as shown in FIG. 13. Also, the display device 32 reads the data in CSV format, using the graphical user interface system of the invention, executes the process as described in section C, and displays the cluster on the display screen, using the spiral rendering.

In another embodiment of the invention, the output part 18 comprises the output data generating part 30 and an external storage medium control part, not shown. For example, the output part 18 outputs data in predetermined format to the storage medium such as a flexible disk, a hard disk, an optical magnetic disk, a magnetic tape, a compact disk (CD), or a digital versatile disk (DVD) under the control of the external storage medium control part. In this case, the data stored in the storage medium is read into the computer apparatus having the graphical user interface of this invention, and displayed using the spiral rendering.

Figure 16:
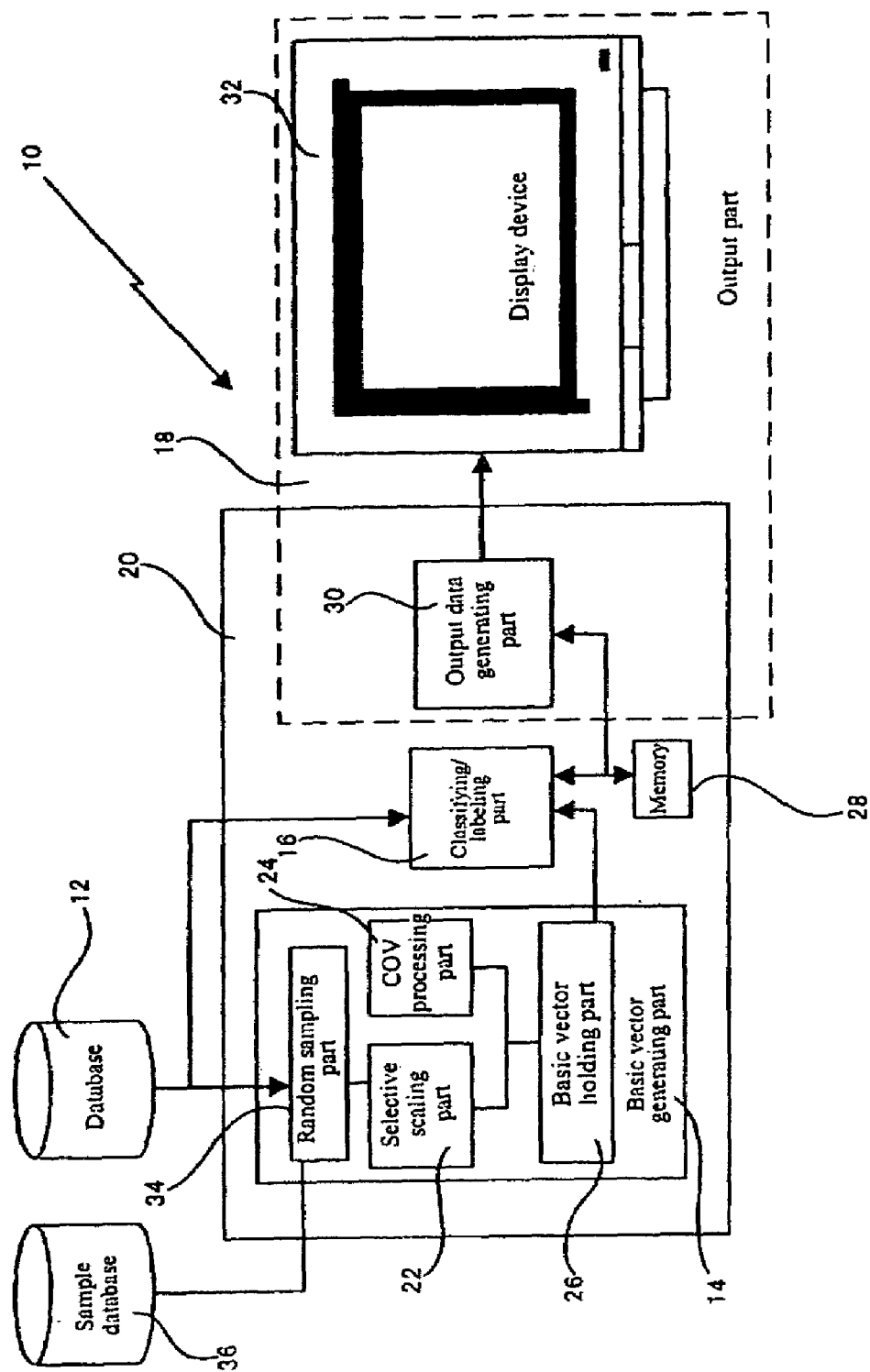
FIG. 16 is a schematic functional block diagram for the data retrieval system according to another embodiment of the invention.

FIG. 16 is a block diagram showing the data retrieval system according to another embodiment of the invention. In the data retrieval system as shown in FIG. 16, the basic vector generating part 14 comprises a random sampling part 34 for causing the random sampling by judging the amount of data in accordance with a processing capability of the computer apparatus 20, and a sample database 36 for storing the sample data generated by random sampling. The random sampling part 34 reads out the number of data stored in the database 12, and compares it with a preset threshold value, in which if the data beyond the threshold value is contained in the database, the random sampling is performed. The random sampling part 34 accepting the instruction extracts the data stored in the database 12 randomly and registered it in the sample database 36.

Also, the random sampling part 34 instructs the selective scaling part 22 to change the data reading address from the database 12 to the sample database 36. The selective scaling part 22 receiving this instruction reads the data from the sample database 36 and generates the basic vector by applying the selective scaling method and the COV method when the configuration of the sample database 36 is ended. The data retrieval system as shown in FIG. 16 allows for selecting the processes depending on the processing ability of the computer apparatus used.

This invention will be described below by way of example, but the invention may not be limited to the examples.

EXAMPLES

Configuration of Test Database

A test database having 2000 keywords and 100,000 data was created. The reason why the test database is artificially configured is that when an already existing news database is used, the existence of an outlier cluster is unknown, and it is unsuitable for judging the data retrieval of the invention. FIG. 17 is a table showing the configuration of the created test database. As shown in FIG. 17, the data consists of a major cluster, an outlier cluster and a noise, in which the major cluster is 5 clusters with an existence ratio of 4%, the outlier cluster is 20 clusters with an existence ratio of 2% and the noise is other clusters with an existence ratio of 1% or less.

Example 1

A sample database was created by randomly sampling 10,000 documents from the above database while preserving each cluster at an existence ratio of 10%. For the data contained in the sample database created in this manner, the number of keywords was reduced to 2000 dimensions, and the basic vector was reduced to 20 dimensions, whereby the outlier cluster was classified and labeled. A threshold value d for cluster detection was 0.4, and the classification of cluster was based on the following expression. It was supposed that b was equal to 1.0 and c was equal to 3.0.

$$\text{if } \left(N \geq M \times \frac{c}{100}\right) \text{ output ("Major cluster");} \quad \text{[Formula 7]}$$
$$\text{else if } \left(N \leq M \times \frac{b}{100}\right) \text{ output ("Noise");}$$
$$\text{else output ("Outlier (Minor) Cluster");}$$

In the calculation, a personal computer mounting Pentium® (registered trademark) 4 processor (1.7 GHz) made by Intel was used. Under the above conditions, the retrieval for cluster by the selective scaling method of the invention was made, so that the major cluster and the outlier cluster were detected at a precision of 100%. In the selective scaling method of the invention, the duplication ratio (percentage that the same data is contained in a plurality of clusters) was as small as that of the LSI method having the lowest ratio in the conventional methods. From the view point of avoiding the repetitive calculation of data for the basic vector, the selective scaling method was efficient.

Comparative Example

As a comparative example, the computation time, the detection ratio of major cluster, the detection ratio of outlier cluster, and the duplication ratio at which the same cluster is detected in a plurality of basic vectors are compared, using a latent semantic interpretation (LSI, comparative example 1) and an ordinary COV method (comparative example 2) for the same sample database. When the duplication ratio is smaller, it is possible to prevent duplicated computation, and more efficient computation. Its result is listed in table 1, with the result of example 1.

TABLE 1

| Example | Detection ratio of major cluster (%) | Detection ratio of outlier cluster (%) | Duplication ratio (%) |
|---|---|---|---|
| Selective Scaling | 100 | 100 | 36 |
| LSI (comparative example 1) | 100 | 50 | 33 |
| COV (comparative example 2) | 100 | 60 | 76 |

Example 2

In this example 2, the stability and precision of data retrieval by random sampling was examined by changing the stop conditions for classifying and labeling the cluster. The random sampling was 1% from the test database, the number of basic vectors was 20, and a stop condition r=3 or for stopping the cluster detection and labeling when no new cluster was found three times consecutively was included. The threshold value d was 0.5, and the labeling was p=1. FIG. 18 shows the results obtained for r=1. In FIG. 18, the clusters detected in the positive and negative directions for a basic vector bi are shown with ID of the basic vector. Also, the contribution in FIG. 18 indicates an average value of inner product iP before normalization. Among the results of FIG. 18, a blank in the line corresponding to the basic vector indicates that no cluster is detected in the direction of the basic vector in this invention. From FIG. 18, it is found that the major cluster and the outlier cluster are excellently retrieved in the positive and negative directions of the basic vector. Moreover, the same examination was made for the instances of r=2 and r=3. As a result, it was revealed that there was less significant effect on the results, and the cluster retrieval at sufficiently high precision was allowed under the stop condition of r=1.

Examples 3, 4 and 5

As a test database, LA Times news data containing 127,742 documents was used. In the example 3, whether or not the outlier cluster to be detected, and the validity of labeling were examined. For the document data contained in LA Times, the cluster detection and labeling was performed in such a manner that the random sampling (1.35% (2000 data): examples 3, 4 and 5) was performed three times, whereby 64 basic vectors were generated to perform the cluster retrieval and labeling. The cluster retrieval was made by calculating the inner product of each basic vector and a document vector generated from the documents of the original LA Times database, and sorting the calculated inner products in descending order. And p labeling keywords and p document intrinsic keywords were listed till the absolute value of inner product is greater than the threshold value in both the positive and negative directions. In this example, when the labeling keyword and the document intrinsic keyword are selected for the same keyword, the labeling keyword is preferentially listed.

Figure 19:
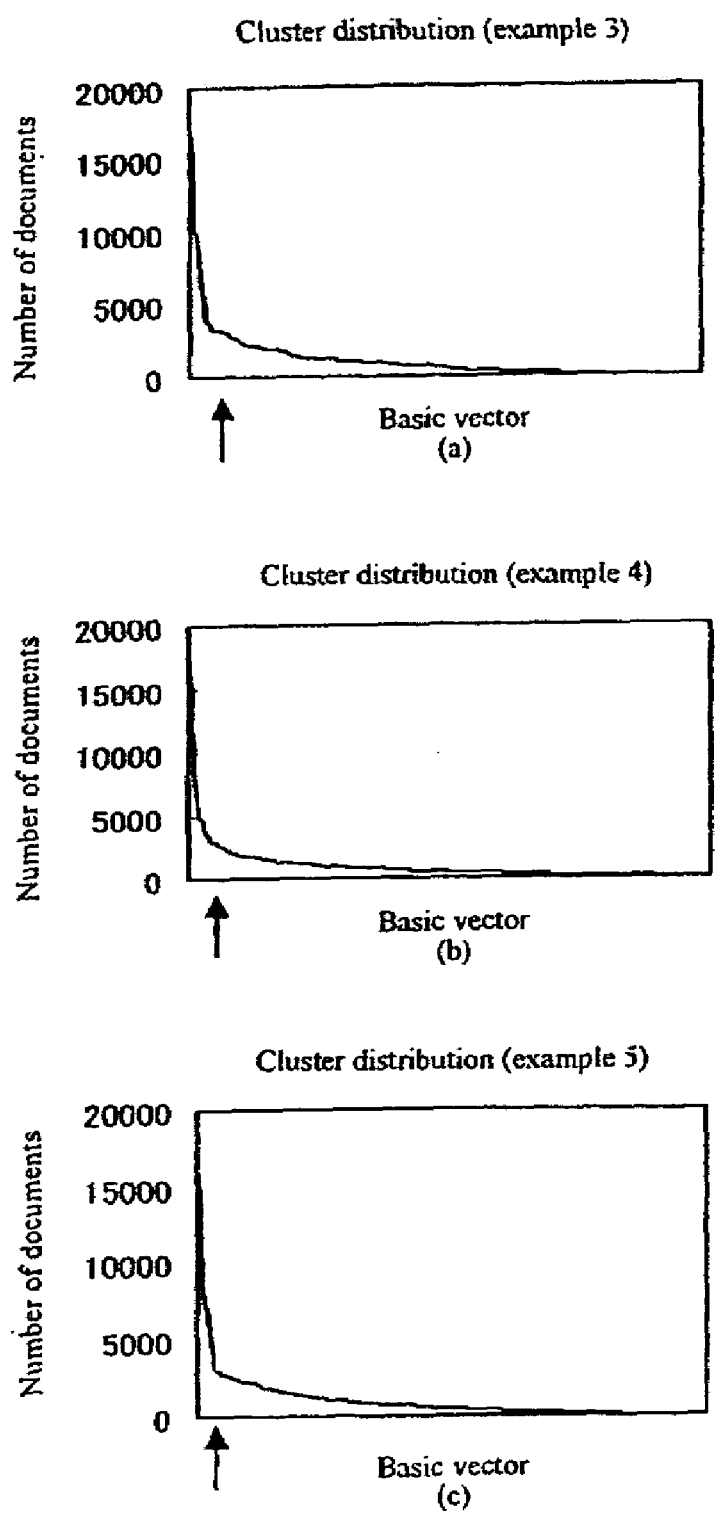
FIG. 19 is a graph plotting the number of data of cluster computed by the conventional method to the number of basic vectors.

For the obtained cluster classification and labeling, the basic vector is plotted along the transverse axis and the number of documents (size of cluster) is plotted along the longitudinal axis, whereby the occupation percentage of outlier cluster was examined. FIG. 19 shows those results. In FIG. 19, the position at which the basic vector corresponds to the cluster of about 3000 data is indicated by the arrow.

Comparative Example 3

Figure 20:
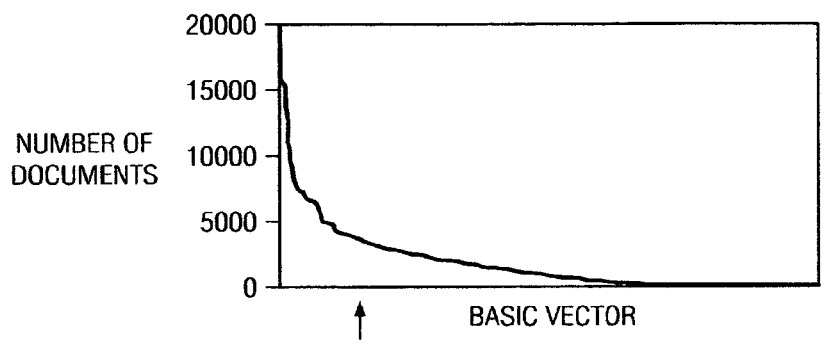
FIG. 20 is a graph showing a display form for a graphical user interface system of the invention.

Using the basic vector generated by the conventional COV method, the cluster classification and labeling were performed, and data was plotted in the same manner as in the examples 3 to 5. FIG. 20 shows the result.

From a comparison between FIGS. 19 and 20, it will be found that even though the same cluster classification and labeling are applied using the equal number 64 basic vectors, the outlier cluster is more distributed than the major cluster by the selective scaling method of the invention as shown in FIG. 19, as compared with the results (comparative example 3) of FIG. 20 by the conventional COV method. Though the graph obtained by the ordinary COV method is a smooth hyperbola, when the selective scaling method of the invention is applied, the number of major clusters is sharply decreased to produce a sharply descending portion, with a relatively high detection percentage of outlier cluster, in any instance of random sampling of the examples 3 to 5. That is, the outlier cluster is more efficiently detected than the major cluster by applying the selective scaling method.

In other words, with the selective scaling method of the invention, though the outlier cluster can not be usually found if the number of basic vectors is increased, the outlier cluster (that may not be found by the COV method) is detected very excellently, while the number of basic vectors, namely, the dimension of a document keyword matrix is kept smaller.

Example 6

Figure 21:
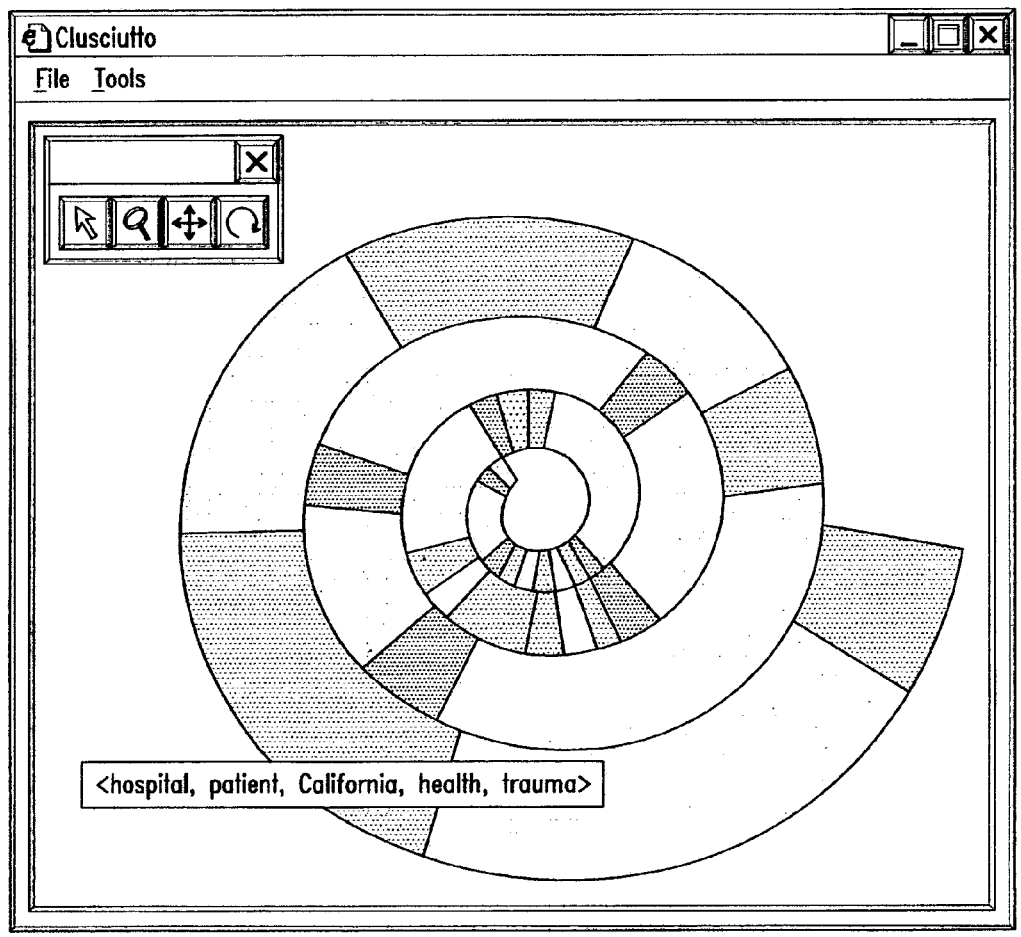
FIG. 21 is a view showing a display form for the graphical user interface system of the invention.

In this example 6, the display of data using the graphical user interface of the invention will be specifically described below. The cluster detection, classification and labeling were performed using the basic vector obtained in the example 1, to create a data file of CSV format. The CSV data file stored in appropriate storage means was read into the graphical user interface system of this invention. Thereby, the clusters were displayed in spiral in which the major clusters having a greater number of documents were arranged in the outer layer, and the clusters having a smaller number of documents were arranged in the inner layer. FIG. 21 is a view showing a display form for the graphical user interface system by applying the spiral rendering, based on the CSV data file obtained in the example 1, and selecting the maximum major cluster with a pointer icon to pop-up display the label. As shown in FIG. 21, with the graphical user interface of the invention, the clusters can be fully displayed for the user, even if the number of clusters is increased.

Example 7

Figure 22:
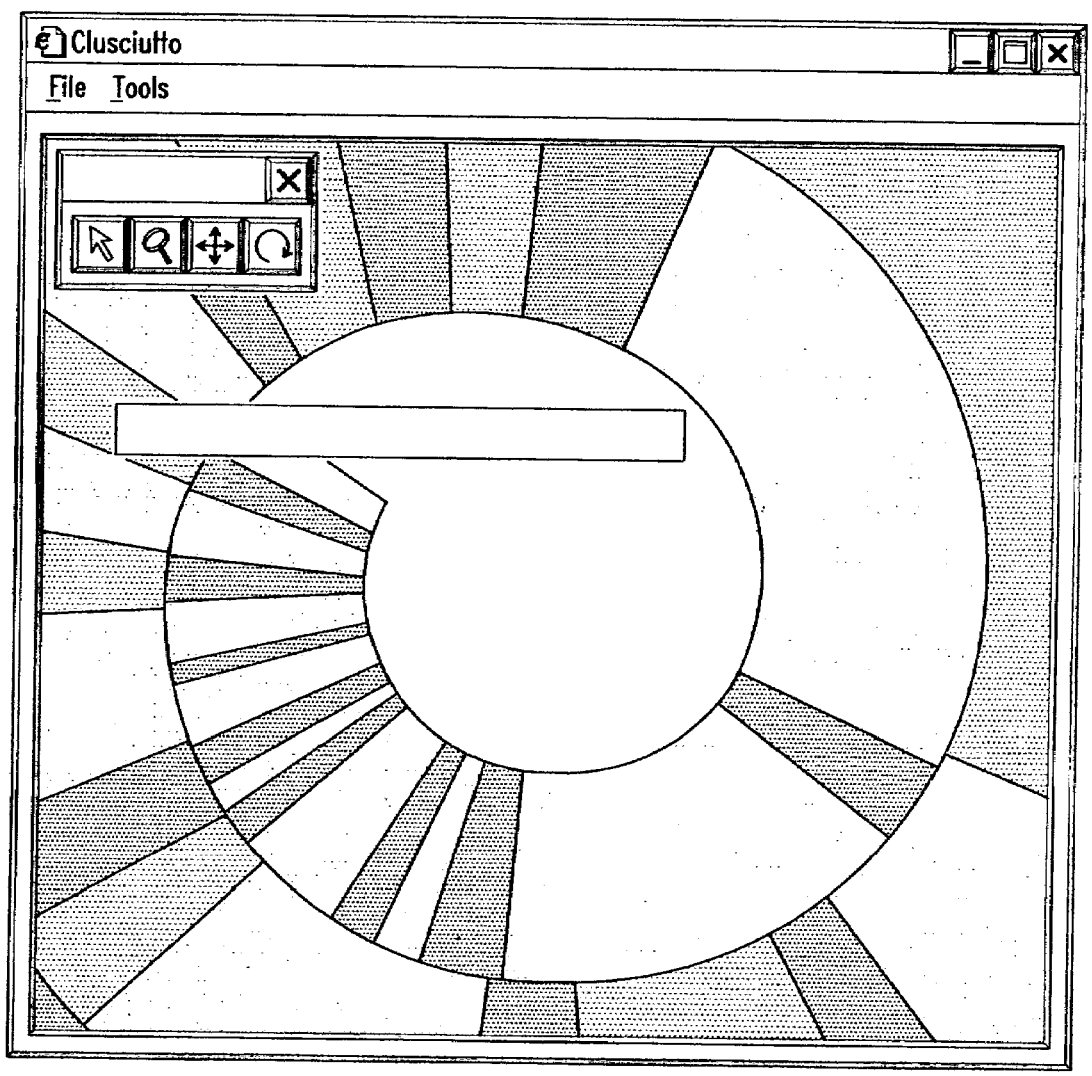
FIG. 22 is a view showing a display form for the graphical user interface system of the invention.

FIG. 22 is a view showing an enlarging process in the graphical user interface system of the invention. In FIG. 22, the label is displayed by enlarging the result of FIG. 21, and selecting another major cluster with a pointer icon. As shown in the examples 6 and 7, the graphical user interface of the invention permits the user to intuitively judge the existence ratio in the database from the major cluster to the outlier cluster, and easily analyze the data contained in the database.

Example 8

Figure 23:
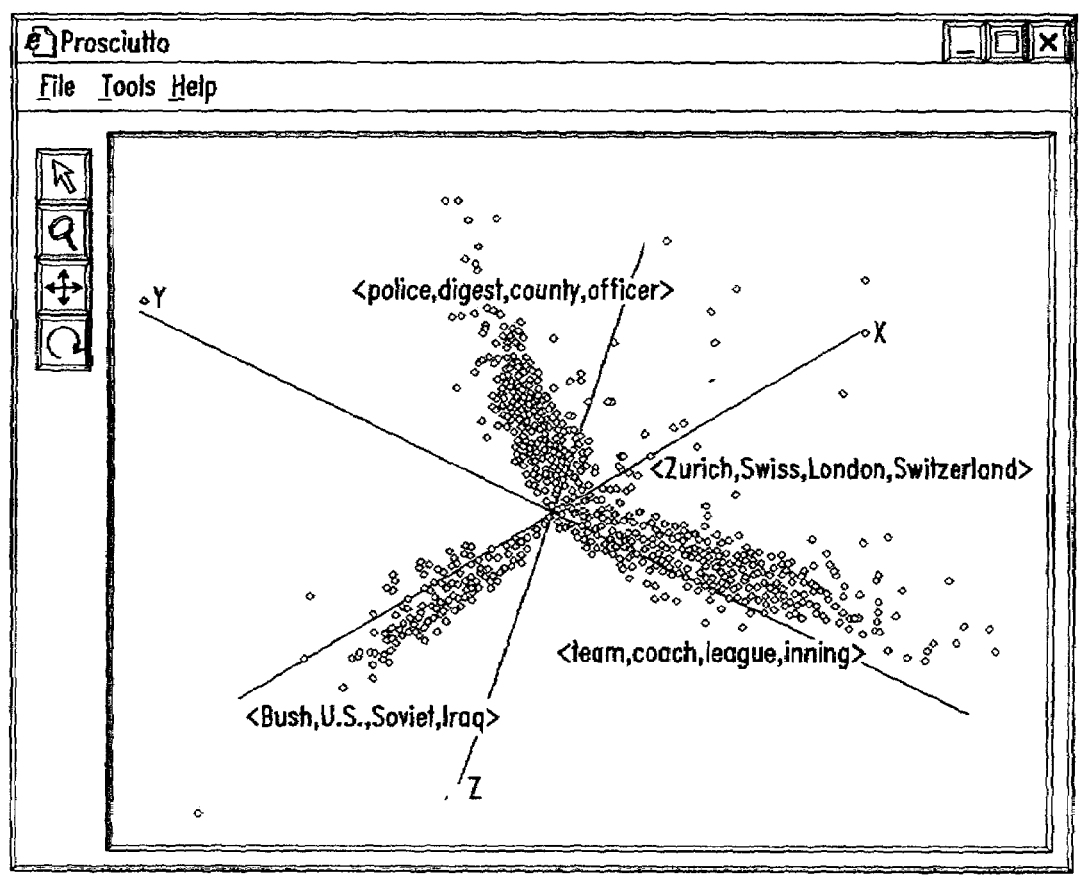
FIG. 23 is a view showing a display form for the graphical user interface system of the invention.

FIG. 23 is a view for cluster display by applying a method as described in Published Unexamined Patent Application No. 2001-329613. This is utilized along with the graphical user interface of spiral shape according to the invention. Though in Published Unexamined Patent Application No. 2001-329613, the document title is pop up, the cluster label is pop up when the cluster is labeled in the invention. In this example 8 of FIG. 23, the user confirms the above label and designates, whereby the corresponding outlier cluster is displayed in the Cartesian coordinate system, using the basic vector corresponding to the label. As shown in FIG. 23, the outlier cluster in the large data can be clearly presented to the user, using the cluster detection, classification and labeling of the invention.

Means or portion for implementing each of the functions of the invention is configured as a software or a software module group described in a programming language for computer, but may not necessarily be configured as a functional block as shown in the drawings.

The above program for performing the information retrieval method of the invention is described in any of various programming languages, such as C language, C++ language, Java○ (registered trademark), and the code describing the program of the invention is stored in a computer readable storage medium such as a magnetic tape, a flexible disk, a hard disk, a compact disk (CD), an optical magnetic disk, or a digital versatile disk (DVD).

As described above, with this invention, the basic vectors are generated efficiently with an enhanced detection ability of the outlier cluster, and the labeling is made in consideration of the similarity and the keyword held by the data. As a result, the labeling is meaningfully enabled for both the similarity and the characteristic of data, whereby the data analysis or retrieval for the documents in the database is easily made. That is, with this invention, it is possible to provide a data retrieval system, a data retrieval method, a program for causing a computer to execute a data retrieval, a computer readable storage medium storing the program, a graphical user interface system for displaying a retrieved document, a program executed on the computer to implement a graphical user interface, and a storage medium storing the program, in which a relatively small number of documents are efficiently retrieved from a large scale database comprising the documents, and displayed.

While the invention has been described with respect to certain preferred embodiments and exemplification's, it is not intended to limit the scope of protection thereby, but solely by the claims appended hereto.

We claim:

1. A data retrieval system for causing a computer to retrieve data being stored in a database, said retrieval system comprising: a database storing data as a vector digitized based on a keyword; a means for generating a residual vector from said data, said residual vector corresponding to a vector in which an element corresponding to a contribution component in a direction of a basic vector calculated is subtracted from a previously obtained residual vector, the basic vector and the residual vector a newly generated residual vector lie in an orthogonal relationship, to compute and store a covariance matrix and an eigenvector of said covariance matrix, and for generating and storing a set of basic vectors from a set of computed eigenvectors; a means for reading out said data and at least one of said eigenvectors from the database, and for computing and storing a contribution vector of said eigenvector to said data, and for contracting or enlarging a residual vector by reading out said contribution vector to compute and store a new eigenvector; and a means for selecting a keyword to be used for labeling clusters according to a similarity between said stored basic vector and said data, and a weight on said similarity so as to store the keyword in the database; means for classifying data into clusters of documents having the same or similar keywords and depending on a similarity between the stored basic vector and the data; and a means for outputting cluster data of a cluster to a graphical user interface system for displaying the cluster data.

2. The data retrieval system according to claim 1, comprising a means for making said basic vectors orthogonal.

3. The data retrieval system according to claim 1, wherein said means for selecting the keyword to be used for labeling clusters to store the keyword in the database further comprises a means for determining the weight on said similarity to said keyword and a means for storing a certain number of keywords in a descending order in the database in connection with said weight.

4. A data retrieval method for causing a computer to retrieve data stored in a database, said data retrieval method comprising the steps of:
  reading out data from a database storing data as a vector digitized based on a keyword;
  computing and storing a covariance matrix and an eigenvector of said covariance matrix, using said data;
  generating and storing a set of basic vectors from a set of said computed eigenvectors;
  reading out said data and at least one eigenvector from the database, and computing and storing a contribution vector of said eigenvector to said data; and computing a residual vector from said data and said eigenvector, and contracting or enlarging a residual vector by reading out said contribution vector to compute and store a new eigenvector; and classifying data into clusters of documents having the same or similar keywords and depending on a similarity between the stored basic vector and the data; and outputting cluster data of a cluster to a graphical user interface system for displaying the cluster data.

5. The data retrieval method according to claim 4, further comprising a step of selecting a keyword to be used for labeling clusters from a similarity between said stored basic vector and said data and a weight on said similarity to store the keyword in the database.

6. The data retrieval method according to claim 5, wherein said step of selecting the keyword to be used for labeling clusters further comprises a step of determining the weight on said similarity to said keyword and storing a certain number of keywords in a descending order in the database in connection with said weight.

7. A computer executable program product comprising a computer readable media having computer executable program thereon for implementing a data retrieval method for causing a computer to retrieve data stored in a database, said program comprising the steps of: reading out data from a database storing data as a vector digitized based on a keyword; computing and storing a covariance matrix and an eigenvector of said covariance matrix, using said data; generating and storing a set of basic vectors from a set of said computed eigenvectors; reading out said data and at least one eigenvector from the database, and computing and storing a contribution vector of said eigenvector to said data, and computing a residual vector from said data and said eigenvector, and contracting or enlarging a residual vector by reading out said contribution vector to compute and store a new eigenvector in the database; and classifying data into clusters of documents having the same or similar keywords and depending on a similarity between the stored basic vector and the data; and outputting cluster data of a cluster to a graphical user interface system for displaying the cluster data.

8. The program product according to claim 7, said program further comprising a step of selecting a keyword to be used for labeling clusters from a similarity between said stored basic vector and said data and a weight on said similarity to store the keyword in the database.

9. The program product according to claim 7, said program further comprising a step of making said basic vectors orthogonal before computing said residual vector.

* * * * *